US008963956B2

(12) United States Patent
Latta et al.

(10) Patent No.: US 8,963,956 B2
(45) Date of Patent: Feb. 24, 2015

(54) LOCATION BASED SKINS FOR MIXED REALITY DISPLAYS

(75) Inventors: Stephen G. Latta, Seattle, WA (US); Benjamin I. Vaught, Seattle, WA (US); Craig R. Maitlen, Woodinville, WA (US); Christopher M. Novak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 643 days.

(21) Appl. No.: 13/214,037

(22) Filed: Aug. 19, 2011

(65) Prior Publication Data
US 2013/0044129 A1    Feb. 21, 2013

(51) Int. Cl.
| | | |
|---|---|---|
| G09G 5/00 | (2006.01) |
| H04N 13/02 | (2006.01) |
| H04N 13/04 | (2006.01) |
| G06F 3/01 | (2006.01) |
| G09G 3/00 | (2006.01) |
| G09G 3/34 | (2006.01) |
| G09G 5/12 | (2006.01) |
| G09G 5/14 | (2006.01) |

(52) U.S. Cl.
CPC ............. *G09G 5/00* (2013.01); *H04N 13/0278* (2013.01); *H04N 13/044* (2013.01); *G06F 3/011* (2013.01); *G09G 3/002* (2013.01); *G09G 3/3413* (2013.01); *G09G 5/12* (2013.01); *G09G 5/14* (2013.01); *G09G 2340/12* (2013.01); *G09G 2354/00* (2013.01); *G09G 2370/10* (2013.01)
USPC ......................................................... 345/633

(58) Field of Classification Search
CPC ....... G06T 19/006; G06T 11/60; G06T 11/00; G06T 13/40; G06T 19/00; G06T 5/50; G06T 15/20; G06T 15/503; G06T 1/00; G06T 1/0021
See application file for complete search history.

(56) References Cited

U.S. PATENT DOCUMENTS

| | | | |
|---|---|---|---|
| 6,198,462 B1 | 3/2001 | Daily et al. | |
| 6,968,158 B1 * | 11/2005 | Bhuta et al. | ..................... 455/68 |
| 7,137,069 B2 | 11/2006 | Abbott et al. | |

(Continued)

OTHER PUBLICATIONS

International Search Report and Written Opinion of the International Searching Authority, dated Dec. 28, 2012 in International Patent Application No. PCT/US2012/051517, 8 pages.

(Continued)

*Primary Examiner* — Kee M Tung
*Assistant Examiner* — Frank Chen
(74) *Attorney, Agent, or Firm* — Heikki Einola; Judy Yee; Micky Minhas

(57) ABSTRACT

The technology provides embodiments for providing a location-based skin for a see-through, mixed reality display device system. In many embodiments, a location-based skin includes a virtual object viewable by a see-through, mixed reality display device system which has been detected in a specific location. Some location-based skins implement an ambient effect. The see-through, mixed reality display device system is detected to be present in a location and receives and displays a skin while in the location in accordance with user settings. User data may be uploaded and displayed in a skin in accordance with user settings. A location may be a physical space at a fixed position and may also be a space defined relative to a position of a real object, for example, another see-through, mixed reality display device system. Furthermore, a location may be a location within another location.

18 Claims, 22 Drawing Sheets

(56) References Cited

U.S. PATENT DOCUMENTS

| | | | |
|---|---|---|---|
| 7,475,088 B2* | 1/2009 | Ziegler | 1/1 |
| 7,500,198 B2 | 3/2009 | Mathews et al. | |
| 7,848,765 B2 | 12/2010 | Phillips et al. | |
| 2003/0146922 A1 | 8/2003 | Navab et al. | |
| 2003/0188150 A1* | 10/2003 | Ohkado et al. | 713/150 |
| 2004/0131232 A1 | 7/2004 | Meisner et al. | |
| 2004/0183751 A1 | 9/2004 | Dempski | |
| 2006/0146012 A1 | 7/2006 | Arneson et al. | |
| 2006/0277474 A1 | 12/2006 | Robarts et al. | |
| 2007/0273610 A1 | 11/2007 | Baillot | |
| 2008/0043013 A1 | 2/2008 | Gruttadauria et al. | |
| 2009/0144657 A1* | 6/2009 | Zhang et al. | 715/810 |
| 2009/0195638 A1 | 8/2009 | Caspi et al. | |
| 2009/0243968 A1 | 10/2009 | Nakazawa | |
| 2010/0011297 A1 | 1/2010 | Tsai et al. | |
| 2010/0238161 A1 | 9/2010 | Varga et al. | |
| 2010/0253594 A1 | 10/2010 | Szczerba et al. | |
| 2010/0257252 A1 | 10/2010 | Dougherty et al. | |
| 2010/0269058 A1 | 10/2010 | Othmer et al. | |
| 2011/0002542 A1 | 1/2011 | Adcock | |
| 2011/0075257 A1 | 3/2011 | Hua et al. | |
| 2011/0161875 A1 | 6/2011 | Kankainen | |
| 2012/0019858 A1* | 1/2012 | Sato | 358/1.15 |
| 2012/0131683 A1* | 5/2012 | Nassar et al. | 726/28 |
| 2012/0299961 A1* | 11/2012 | Ramkumar et al. | 345/632 |
| 2013/0307874 A1* | 11/2013 | Blanchflower et al. | 345/633 |

OTHER PUBLICATIONS

International Search Report and Written Opinion of the International Searching Authority, dated Dec. 10, 2012 in International Patent Application No. PCT/US2012/060144, 10 pages.

Moore, Antoni, "Cubes, shadows and comic strips—a.k.a. Interfaces, metaphors and maps?," Proceedings of the 16th Annual Colloquium of the Spatial Information Research Centre (SIRC 2004). Nov. 29-30, 2004, Dunedin, New Zealand, 5 pages.

Rehman et al., "Visually Interactive Location-Aware Computing," Proceedings of the Seventh International Conference on Ubiquitous Computing (UbiComp '05), Sep. 11-14, 2005, pp. 177-194, Springer-Verlag Berlin Heidelberg, 18 pages.

"What is skin?," Definition from WhatIs.com [online], Copyright 2008 [retrieved on May 17, 2011], Retrieved from the Internet: <URL:http://whatis.techtarget.com/definition/0,,sid9_gci213718,00.html>, 3 pages.

"Digital Skin Innovative Digital Solutions," digital-skin.net [online], Copyright 2010 [retrieved on May 17, 2011], Retrieved from the Internet: <URL:http://www.digital-skin.net/>, 3 pages.

Cipollo, Diane, "Photoshop Selection Tools and Content-Aware," BellaOnline—The Voice of Women [online], [retrieved on May 3, 2011], Retrieved from the Internet: URL <http://www.bellaonline.com/articles/art68100.asp>, 3 pages.

"Diminished Reality—Remove objects from video on the fly," Tech Tips [online], Oct. 21, 2010 [retrieved on May 3, 2011], Retrieved from the Internet: URL: <http://techattitude.com/tools-and-softwares/diminished-reality-remove-objects-from-video-on-the-fly/>, 3 pages.

Hunter, Viola,"How to Remove an Unwanted Object from a Video," associatedcontent [online], Jun. 23, 2009 [retrieved on May 3, 2011], Retrieved from the Internet: URL <http://www.associatedcontent.com/article/1840997/how_to_remove_an_unwanted_object_from_pg2.html?cat=15>, 2 pages.

U.S. Appl. No. 13/274,136, filed Oct. 14, 2011.

* cited by examiner

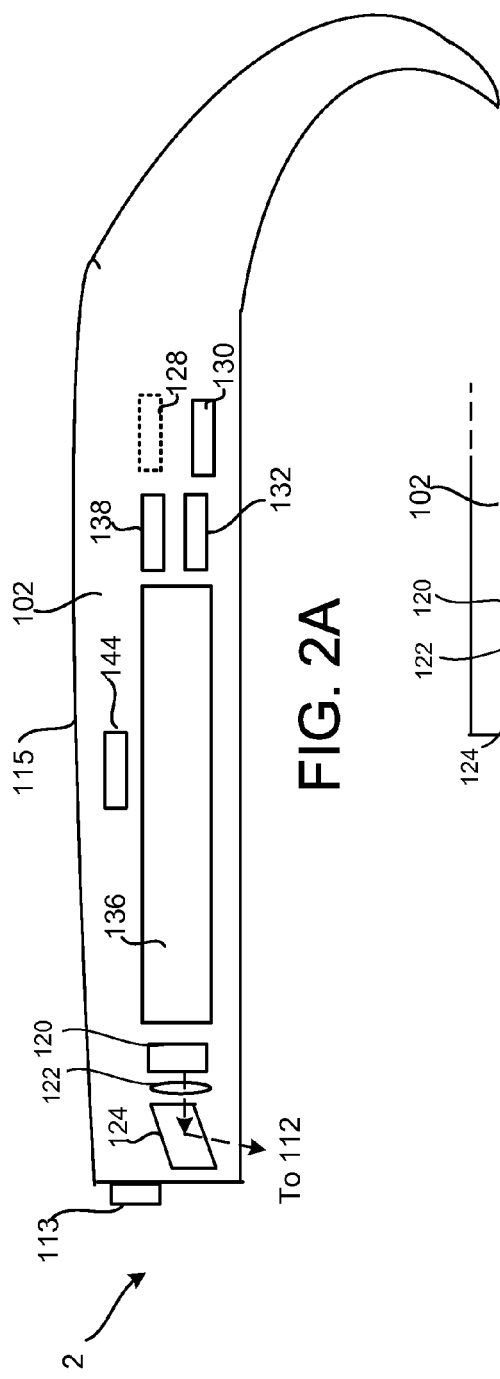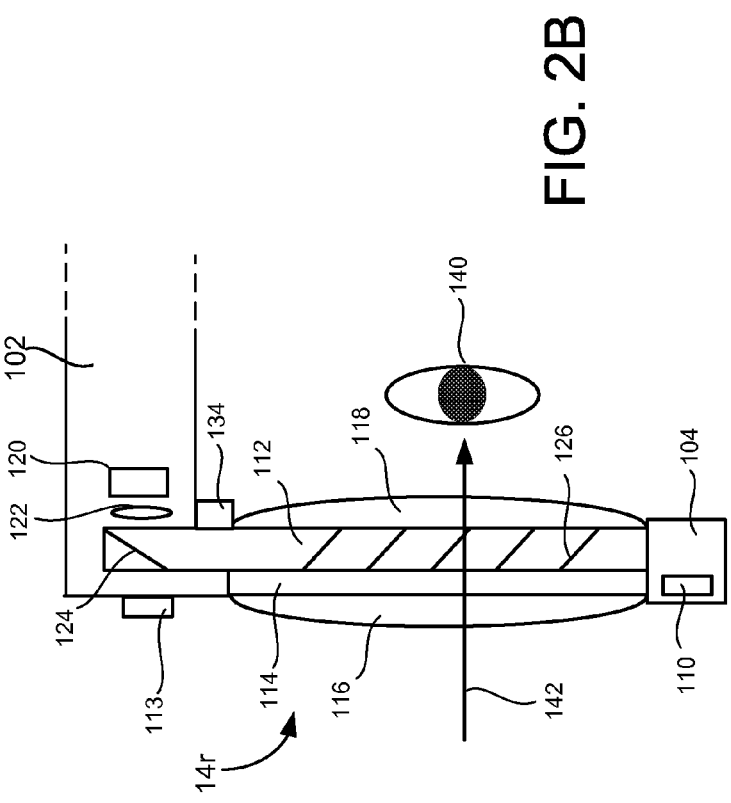

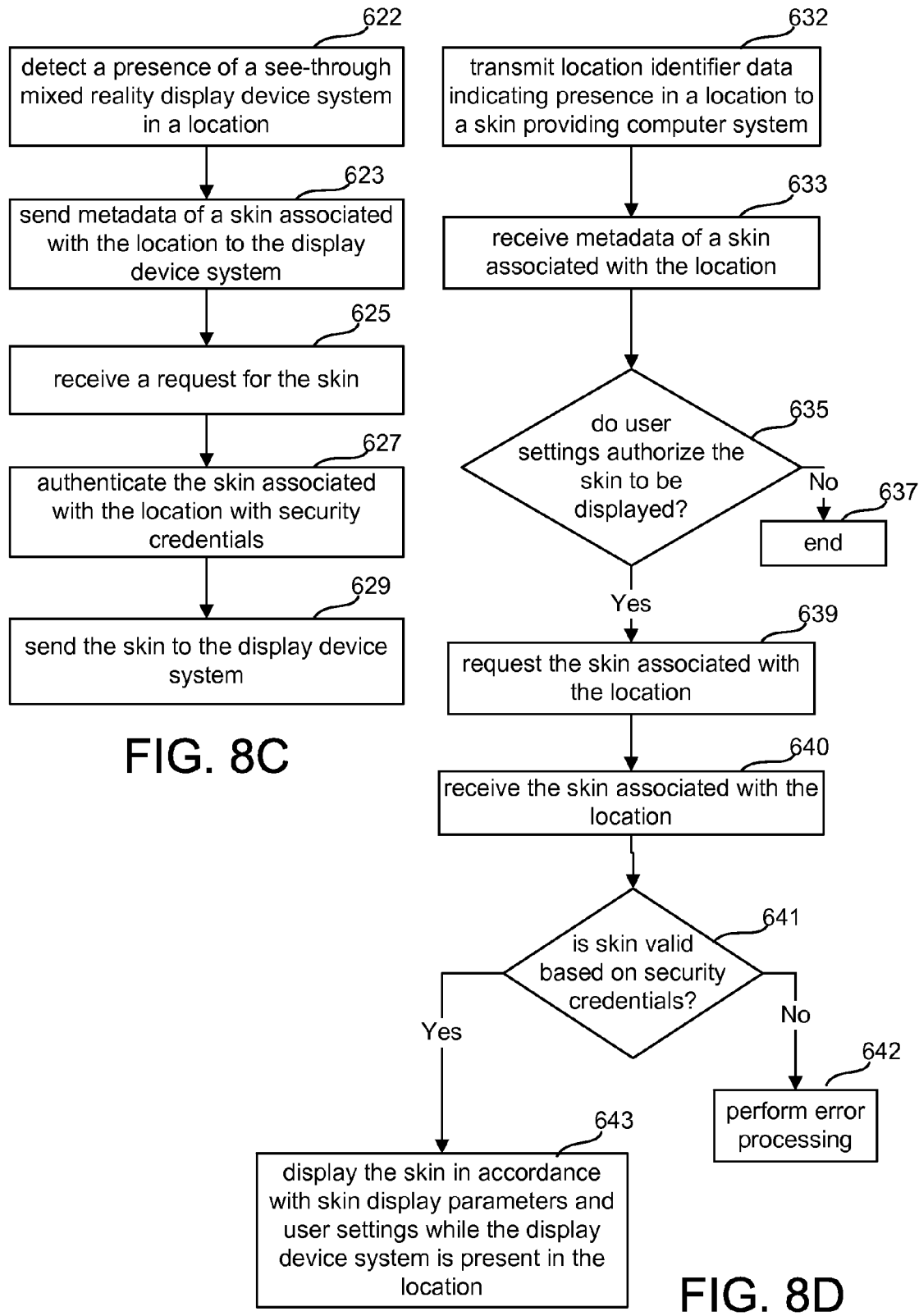

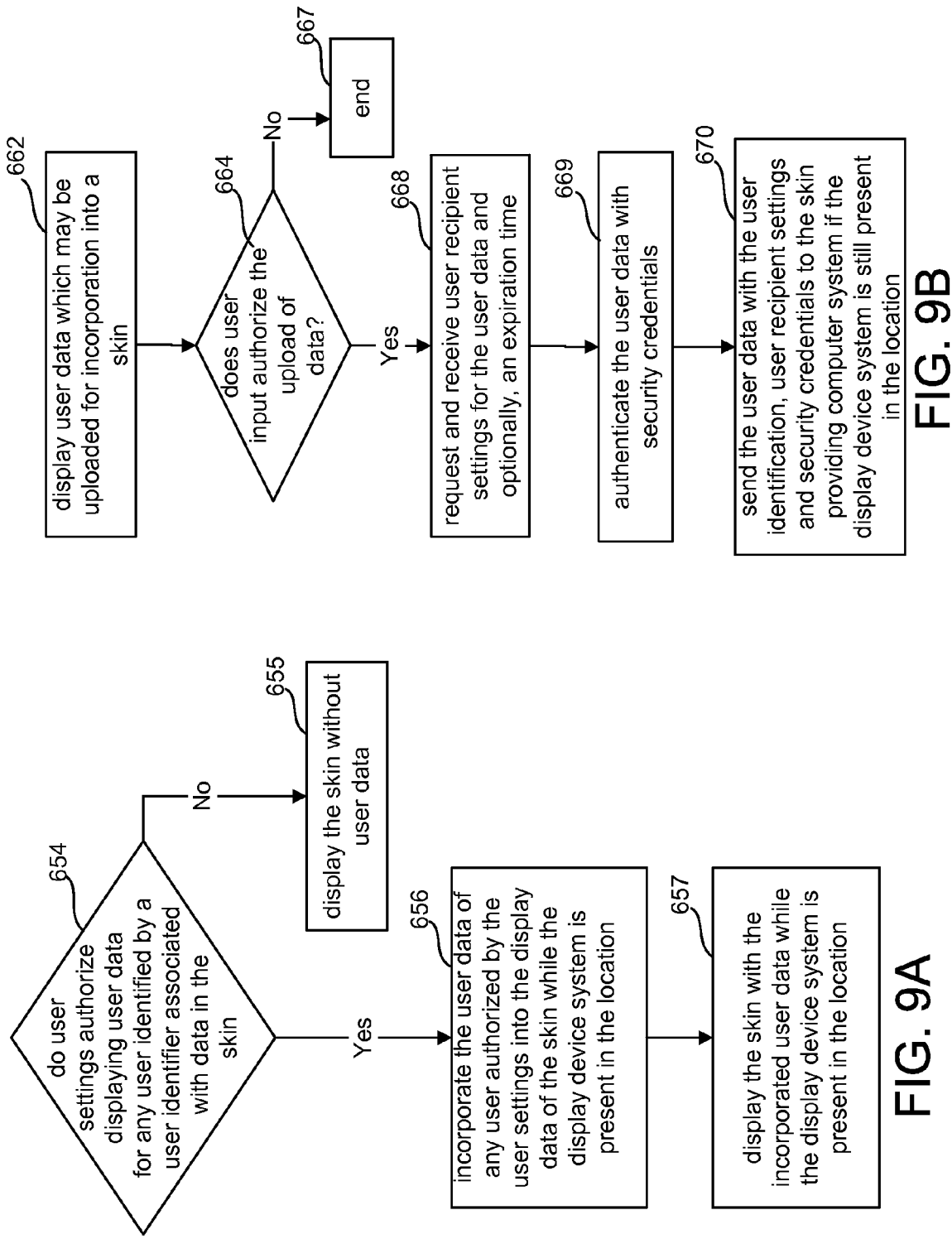

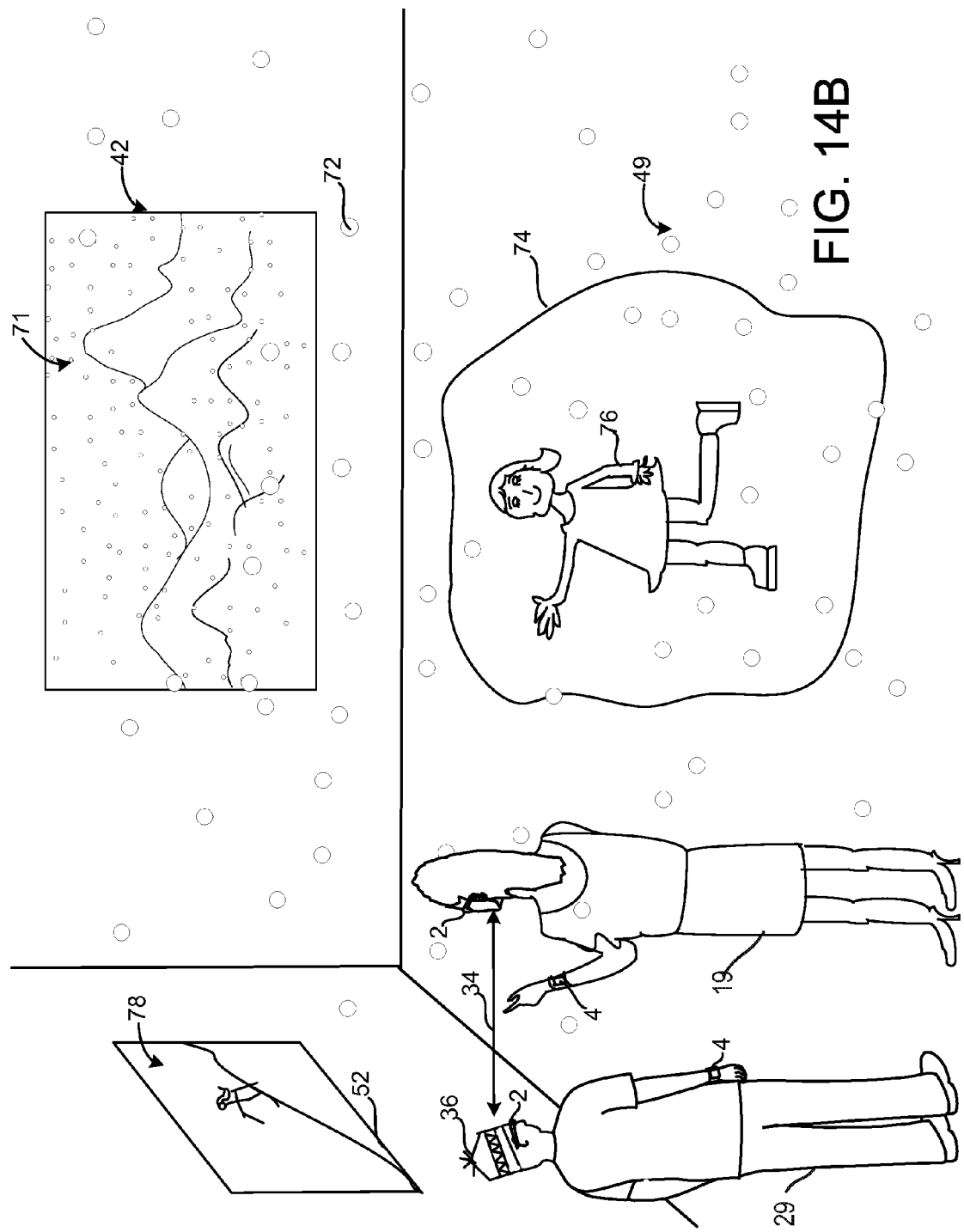

LOCATION BASED SKINS FOR MIXED REALITY DISPLAYS

BACKGROUND

Today's assorted digital tidbits (five-star ratings, Likes, check-in's, etc.) don't substantially change what it feels like to be somewhere, physically. Shop owners, librarians, city planners and others spend untold amounts of money both to create the right ambiance within their physical space and to create their digital website. However, there is often a gap or disconnect between the digital presence and the ambiance of the actual physical location.

SUMMARY

Mixed reality is a technology that allows virtual imagery to be mixed with a real world view. A near-eye display may be worn by a user to view the mixed imagery of real objects and virtual objects displayed in the user's field of view. In many embodiments, a location-based skin includes a virtual object viewable with a mixed reality device which has been detected in a specific location. Some location-based skins implement an ambient effect, be it audio, visual or both when executed by a mixed reality device in the location. Skins allow digital information to augment characteristics of a location, which is a physical space, through audio and visual effects anchored to the space. Some examples of a location are a room, a building, an outdoor area defined by a perimeter or a distance of "personal space" around a user.

The technology provides an embodiment of one or more processor readable storage media having instructions encoded thereon which instructions cause one or more processors to execute a method for displaying a location-based skin by a see-through, mixed reality display device system. The method comprises transmitting location identifier data indicating presence in a location to a skin providing computer system and receiving a skin associated with the location from the skin providing computer system. A skin includes display data for a virtual object in the location. Responsive to the skin being authenticated, displaying the skin in accordance with skin display parameters and user settings while the see-through, mixed reality display device system is present in the location.

The technology provides an embodiment of a method for providing a location-based skin to a see-through, mixed reality display device system. The method comprises detecting a presence of the see-through mixed reality display device system in a location, authenticating a skin associated with the location based on security credentials, and sending the skin and metadata to the see-through, mixed reality display device system.

The technology provides an embodiment of a system for providing a location-based skin to a see-through, mixed reality display device system. The system comprises a computer system comprising one or more processors and a memory accessible by the one or more processors. The computer system is communicatively coupled via a network to the see-through mixed reality display device system. The memory stores display data of one or more skins in a format which the see-through, mixed reality display device system can process for outputting the skin. The one or more skins include at least one skin for generating image data by the mixed reality device of a virtual object at a position in a location when the position is in a user field of view of the see-through, mixed reality display device system. Additionally, the computer system comprises one or more sensors for detecting a presence of the see-through, mixed reality display device system in the location. The one or more processors are capable of sending the one or more skins to the see-through, mixed reality display device system responsive to detecting the presence of the display device system in the location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a side view of an eyeglass temple of the frame of in an embodiment of the see-through, mixed reality display device embodied as eyeglasses providing support for hardware and software components.

FIG. 2B is a top view of an embodiment of a display optical system of a see-through, near-eye, mixed reality device.

FIG. 8C is a flowchart of another method embodiment for providing a location-based skin to a see-through, mixed reality display device system.

FIG. 8D is a flowchart of another method embodiment for displaying a location-based skin by a see-through, mixed reality display device system.

FIG. 9A is a flowchart of a method embodiment for displaying user data from other users in accordance with user settings.

FIG. 9B is a flowchart of a method embodiment for sending user data for incorporation into a skin.

FIG. 14B illustrates another example of a location based skin viewable through a see-through, mixed reality display device system wherein the location is a distance from another mixed reality display device system.

DETAILED DESCRIPTION

The technology provides various embodiments of a system for providing a location-based skin to a see-through, mixed reality display device system for display by the mixed reality display device system. A location-based skin allows digital information to be attached to a location. A resulting mixed reality ambiance bridges the gap between the physical and digital worlds in a natural way. A location may be a physical space or environment at fixed geographic coordinates like a store, coffee shop, or a home. A location may also be a space defined relative to a position of a real object, for example, another see-through, mixed reality display device system. Furthermore, a location may be a sub-location of another location. For example, a building may provide building wide skins, a specific skin for a specific room, and another specific skin associated with a distance about an object in the specific room.

A feature of a see-through, augmented reality display device unlike other display devices is that the images displayed do not monopolize the user's view. When a user looks at a computer screen of a laptop, desktop computer or smartphone, software executing on the processor generates what is viewed on one hundred percent of the computer screen. The user interface through which a user receives audio or visual content output by the computer system and enters input is formatted for the computer screen. The user's view is diverted from the real world when looking at the computer screen. With a see-through, augmented or mixed reality display device, the user can literally see through the display and interact with the real world while also seeing images generated by one or more software applications. One may say there is shared control of the display view by the executing software and the user's head movements and physical environment.

The embodiments discussed below provides examples of detecting the presence of a see-through, mixed reality display device system in a location, providing a skin to the display device system in accordance with user settings and sending and incorporating user data in accordance with user settings for the user of the mixed reality display device system. The discussion of the figures below begin with describing embodiments of hardware and software components which leverage network connectivity for providing a location based skin for display by a see through, mixed reality display device system in a location.

Figure 1A:
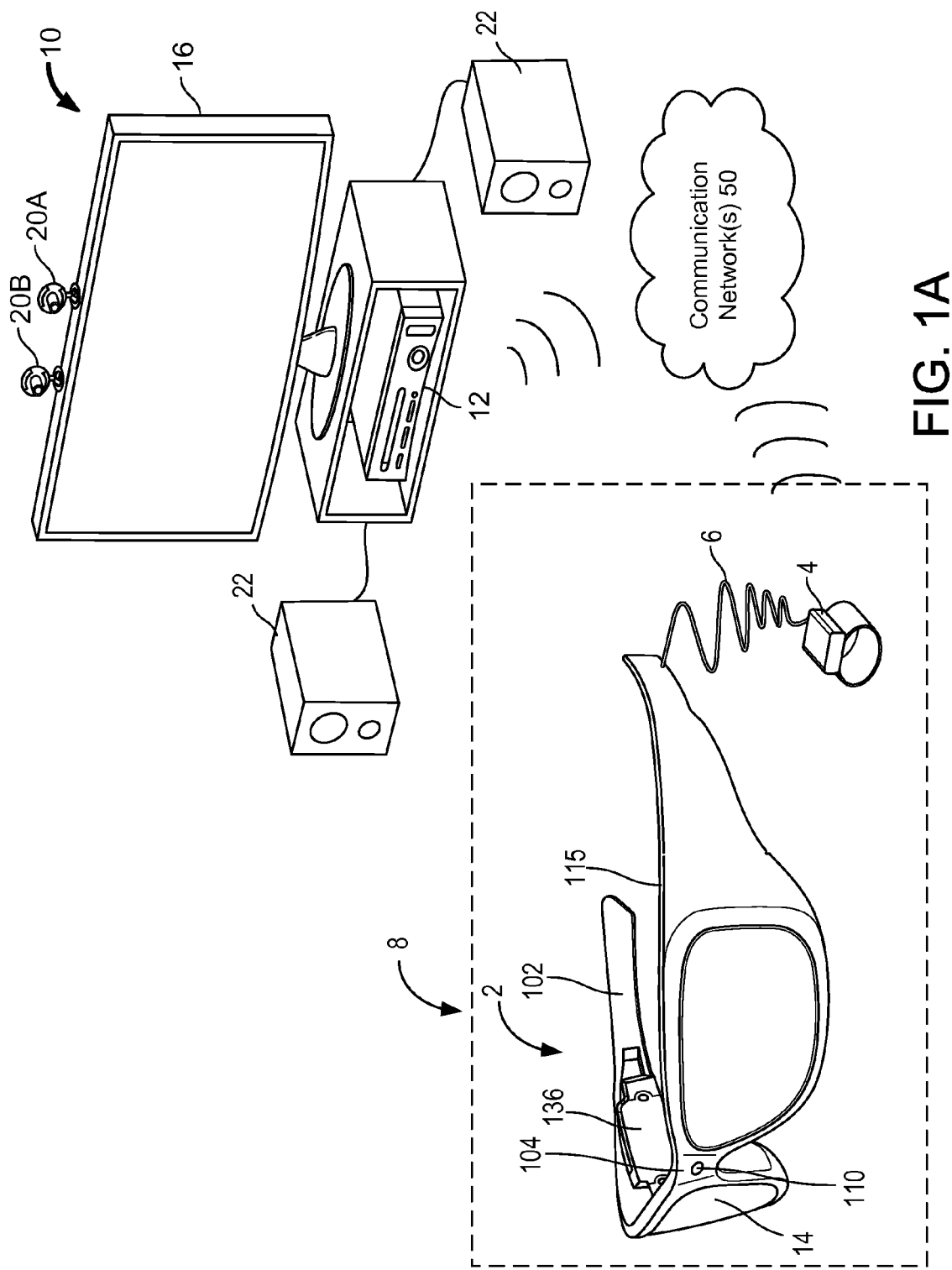
FIG. 1A is a block diagram depicting example components of one embodiment of a see-through, mixed reality display device system.

FIG. 1A is a block diagram depicting example components of one embodiment of a see-through, augmented or mixed reality display device system. System 8 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infrared, RFID transmission, wireless Universal Serial Bus (WUSB), cellular, 3G, 4G or other wireless communication means) over a communication network 50 to one or more hub computing systems 12 whether located nearby in this example or at a remote location. In other embodiments, the functionality of the processing unit 4 may be integrated in software and hardware components of the display device 2.

Head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

Hub computing system 12 may be a computer, a gaming system or console, or a combination of one or more of these. According to an example embodiment, the hub computing system 12 may include hardware components and/or software components such that hub computing system 12 may be used to execute applications such as gaming applications, non-gaming applications, a skin application or the like. An application may be executing on hub computing system 12, or by one or more processors of the see-through mixed reality system 8.

In this embodiment, hub computing system 12 is communicatively coupled to one or more capture devices, such as capture devices 20A and 20B. In other embodiments, more or less than two capture devices can be used to capture the room or other physical environment of the user.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character. Each capture device, 20A and 20B, may also include a microphone (not shown). Hub computing system 12 may be connected to an audiovisual device 16 such as a television, a monitor, a high-definition television (HDTV), or the like that may provide game or application visuals. In some instances, the audiovisual device 16 may be a three-dimensional display device. In one example, audiovisual device 16 includes internal speakers. In other embodiments, audiovisual device 16, a separate stereo or hub computing system 12 is connected to external speakers 22.

Figure 1B:
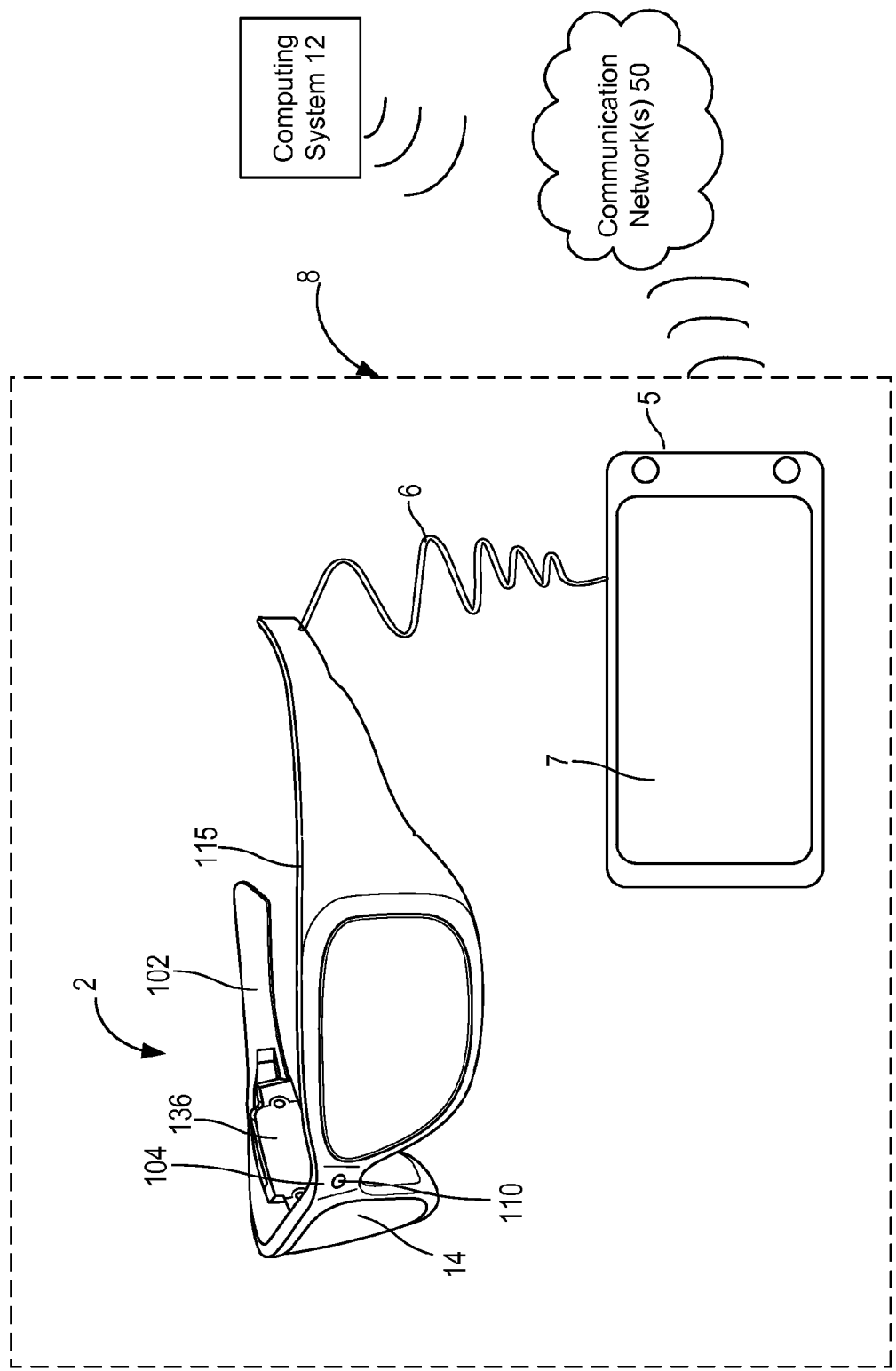
FIG. 1B is a block diagram depicting example components of another embodiment of a see-through, mixed reality display device system.

FIG. 1B is a block diagram depicting example components of another embodiment of a see-through, augmented or mixed reality display device system 8 which may communicate over a communication network 50 with other devices. In this embodiment, the near-eye display device 2 communicates with a mobile computing device 5 as an example embodiment of the processing unit 4. In the illustrated example, the mobile device 5 communicates via wire 6, but communication may also be wireless in other examples.

Furthermore, as in the hub computing system 12, applications like a device skin application may execute on a processor of the mobile device 5 which user actions control and which may display one or more skins by the display optical systems 14. A display 7 of the mobile device 5 may also display data, for example menus, for executing applications. The mobile device 5 also provides a network interface for communicating with other computing devices like hub computing system 12 over the Internet 50 or via another communication network 50 (e.g. WiFi, Bluetooth, infrared, RFID transmission, WUSB, cellular, 3G, 4G or other wireless communication means) via a wired or wireless communication medium using a wired or wireless communication protocol. A remote network accessible computer system like hub computing system 12 may be leveraged for processing power and remote data access by a processing unit 4 like mobile device 5. Examples of hardware and software components of a mobile device 5 such as may be embodied in a smartphone or tablet computing device are described in FIG. 16, and these components can embody the hardware and software components of a processing unit 4 such as those discussed in the embodiment of FIG. 3B. Some other examples of mobile devices 5 are a laptop or notebook computer and a netbook computer.

FIG. 2A is a side view of an eyeglass temple 102 of the frame 115 in an embodiment of the see-through, mixed reality display device embodied as eyeglasses providing support for hardware and software components. At the front of frame 115 is physical environment facing video camera 113 that can capture video and still images which are transmitted to the processing unit 4,5. Particularly in some embodiments where the display device 2 is not operating in conjunction with depth cameras like capture devices 20a and 20b of the hub system 12, the physical environment facing camera 113 may be a depth camera as well as a visible light sensitive camera. The camera may include one or more depth sensors and corresponding infrared illuminators as well as visible light detectors. Other examples of detectors that may be included on the head mounted display device 2 without limitation, are SONAR, LIDAR, Structured Light, and/or Time of Flight distance detectors positioned to detect information that a wearer of the device may be viewing.

The data from the camera may be sent to a processor 210 of the control circuitry 136, or the processing unit 4,5 or both, which may process them but which the unit 4,5 may also send to one or more computer systems 12 over a network 50 for processing. The processing identifies and maps the user's real world field of view. Additionally, the physical environment facing camera 113 may also include a light meter for measuring ambient light.

Control circuits 136 provide various electronics that support the other components of head mounted display device 2. More details of control circuits 136 are provided below with respect to FIG. 3A. Inside, or mounted to temple 102, are ear phones 130, inertial sensors 132, GPS transceiver 144 and temperature sensor 138. In one embodiment, inertial sensors 132 include a three axis magnetometer 132A, three axis gyro 132B and three axis accelerometer 132C (See FIG. 3A). The inertial sensors are for sensing position, orientation, and sudden accelerations of head mounted display device 2. From these movements, head position may also be determined.

Mounted to or inside temple 102 is an image source or image generation unit 120. In one embodiment, the image source includes micro display assembly 120 for projecting images of one or more virtual objects and lens system 122 for directing images from micro display 120 into light guide optical element 112. Lens system 122 may include one or more lenses. In one embodiment, lens system 122 includes one or more collimating lenses. In the illustrated example, a reflecting element 124 of light guide optical element 112 receives the images directed by the lens system 122.

There are different image generation technologies that can be used to implement micro display 120. For example, micro display 120 can be implemented using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. Digital light processing (DGP), liquid crystal on silicon (LCOS) and Mirasol® display technology from Qualcomm, inc. are all examples of reflective technologies. Additionally, micro display 120 can be implemented using an emissive technology where light is generated by the display, see for example, a PicoP™ display engine from Microvision, Inc.

FIG. 2B is a top view of an embodiment of a display optical system 14 of a see-through, near-eye, augmented or mixed reality device. A portion of the frame 115 of the near-eye display device 2 will surround a display optical system 14 for providing support for one or more lenses as illustrated and making electrical connections. In order to show the components of the display optical system 14, in this case 14r for the right eye system, in the head mounted display device 2, a portion of the frame 115 surrounding the display optical system is not depicted.

In one embodiment, the display optical system 14 includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112. See-through lenses 116 and 118 are standard lenses used in eye glasses and can be made to any prescription (including no prescription). In some embodiments, head mounted display device 2 will include only one see-through lens or no see-through lenses. Opacity filter 114 filters out natural light (either on a per pixel basis or uniformly) to enhance the contrast of the virtual imagery. Light guide optical element 112 channels artificial light to the eye. More details of the opacity filter 114 and light guide optical element 112 is provided below.

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142 representing an optical axis of the display optical system 14r, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. In one embodiment, each eye will have its own light guide optical element 112. When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. In one example, 100% transmissivity represents a perfectly clear lens. An "alpha" scale can be defined from 0-100%, where 0% allows no light to pass and 100% allows all light to pass. The value of alpha can be set for each pixel by the opacity filter control unit 224 described below.

A mask of alpha values can be used from a rendering pipeline, after z-buffering with proxies for real-world objects. When the system renders a scene for the mixed reality display, it takes note of which real-world objects are in front of which virtual objects. If a virtual object is in front of a real-world object, then the opacity should be on for the coverage area of the virtual object. If the virtual object is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

In one embodiment, the display and the opacity filter are rendered simultaneously and are calibrated to a user's precise position in space to compensate for angle-offset issues. Eye tracking can be employed to compute the correct image offset at the extremities of the viewing field. In some embodiments, a temporal or spatial fade in the amount of opacity can be used in the opacity filter. Similarly, a temporal or spatial fade in the virtual image can be used. In one approach, a temporal fade in the amount of opacity of the opacity filter corresponds to a temporal fade in the virtual image. In another approach, a spatial fade in the amount of opacity of the opacity filter corresponds to a spatial fade in the virtual image.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of opacity outside the perimeter.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 2B), which will include an eye tracking illumination device 134A and eye tracking camera 134B (see FIG. 3A).

In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately. Alternatively, eye tracking camera may be an alternative form of tracking camera using any motion based image of the eye to detect position, with or without an illumination source.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See Control your mobile music with eyeball-activated earphones!, Feb. 19, 2010 [retrieved from the Internet Jul. 12, 2011: http://www.wirefresh.com/control-your-mobile-music-with-eyeball-actvated-headphones].) Eye blinks may be tracked as commands. Other embodiments for tracking eyes movements such as blinks which are based on pattern and motion recognition in image data from the small eye tracking camera 134 mounted on the inside of the glasses, can also be used.

In the embodiments above, the specific number of lenses shown are just examples. Other numbers and configurations of lenses operating on the same principles may be used. Additionally, FIGS. 2A and 2B only show half of the head mounted display device 2. A full head mounted display device would include another set of see through lenses 116 and 118, another opacity filter 114, another light guide optical element 112, another micro display 120, another lens system 122 physical environment facing camera 113 (also referred to as outward facing or front facing camera 113), eye tracking assembly 134, earphone 130, sensors 128 if present and temperature sensor 138. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3A:
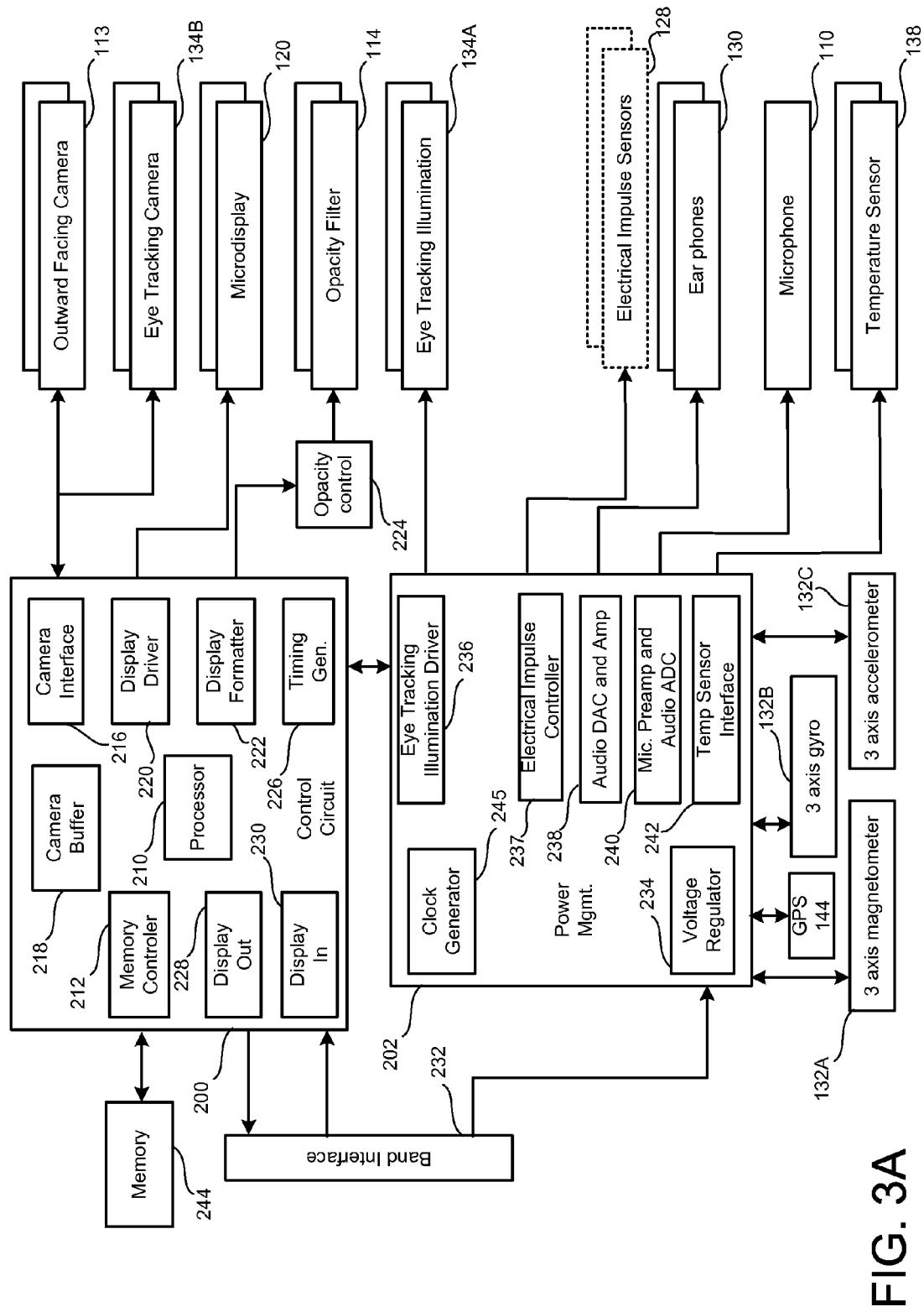
FIG. 3A is a block diagram of one embodiment of hardware and software components of a see-through, near-eye, mixed reality display device as may be used with one or more embodiments.
Figure 3B:
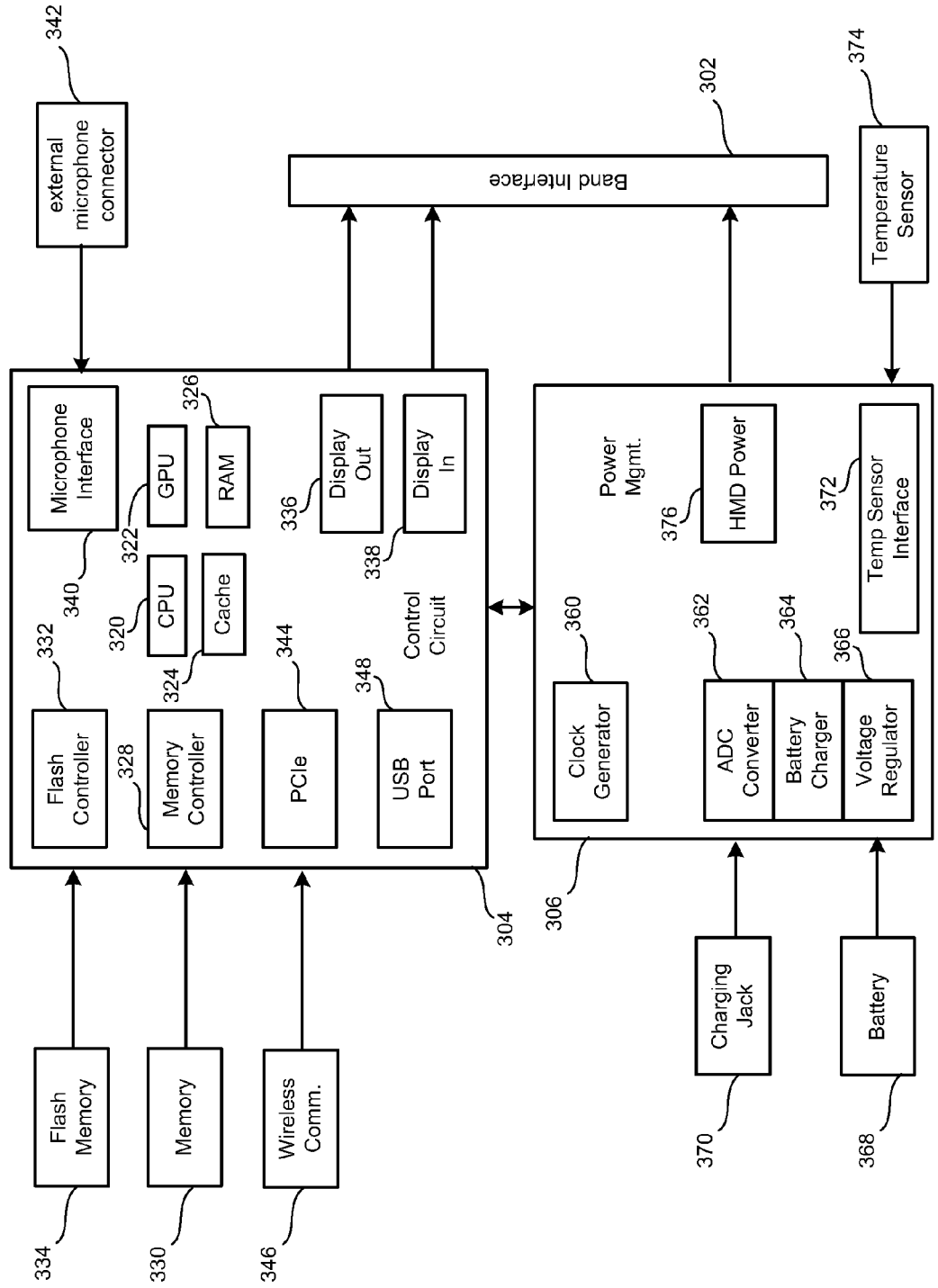
FIG. 3B is a block diagram describing the various components of a processing unit.

FIG. 3A is a block diagram of one embodiment of hardware and software components of a see-through, near-eye, mixed reality display device 2 as may be used with one or more embodiments. FIG. 3B is a block diagram describing the various components of a processing unit 4,5. In this embodiment, near-eye display device 2, receives instructions about a virtual image from processing unit 4,5 and provides data from sensors back to processing unit 4,5. Software and hardware components which may be embodied in a processing unit 4,5, for example as depicted in FIG. 3B, receive the sensory data from the display device 2 and may also receive sensory information from a computing system 12 over a network 50 (See FIGS. 1A and 1B). Based on that information, processing unit 4, 5 will determine where and when to provide a virtual image to the user and send instructions accordingly to the control circuitry 136 of the display device 2.

Note that some of the components of FIG. 3A (e.g., outward or physical environment facing camera 113, eye camera 134, micro display 120, opacity filter 114, eye tracking illumination unit 134A, earphones 130, sensors 128 if present, and temperature sensor 138 are shown in shadow to indicate that there are at least two of each of those devices, at least one for the left side and at least one for the right side of head mounted display device 2. FIG. 3A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 5, 12, 210 performing processing for the mixed reality system. The display formatter 222 can identify to the opacity control unit 224 transmissivity settings for which pixels of the display optical system 14. Timing generator 226 is used to provide timing data for the system. Display out interface 228 includes a buffer for providing images from physical environment facing cameras 113 and the eye cameras 134 to the processing unit 4, 5. Display in interface 230 includes a buffer for receiving images such as a virtual image to be displayed on microdisplay 120. Display out 228 and display in 230 communicate with band interface 232 which is an interface to processing unit 4, 5.

Power management circuit 202 includes voltage regulator 234, eye tracking illumination driver 236, audio DAC and amplifier 238, microphone preamplifier and audio ADC 240, temperature sensor interface 242, electrical impulse controller 237, and clock generator 245. Voltage regulator 234 receives power from processing unit 4,5 via band interface 232 and provides that power to the other components of head mounted display device 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 110. Temperature sensor interface 242 is an interface for temperature sensor 138. Electrical impulse controller 237 receives data indicating eye movements from the sensor 128 if implemented by the display device 2. Power management unit 202 also provides power and receives data back from three axis magnetometer 132A, three axis gyro 132B and three axis accelerometer 132C. Power management unit 202 also provides power and receives data back from and sends data to GPS transceiver 144.

FIG. 3B is a block diagram of one embodiment of the hardware and software components of a processing unit 4 associated with a see-through, near-eye, mixed reality display unit. The mobile device 5 may include this embodiment of hardware and software components as well as similar components which perform similar functions. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, cellular, 3G, 4G communication devices, wireless USB (WUSB) communication device, RFID communication device etc. The wireless communication component 346 thus allows peer-to-peer data transfers with for example, another display device system 8, as well as connection to a larger network via a wireless router or cell tower. The USB port can be used to dock the processing unit 4, 5 to another display device system 8. Additionally, the processing unit 4,5 can dock to another computing system 12 in order to load data or software onto processing unit 4, 5, as well as charge processing unit 4, 5. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

A location based skin may be applied to a person or thing in a location and which is within a user field of view of a see-through, mixed reality display device system. The location of people and things in the user's environment are tracked in order to track a virtual object of a skin to its intended real object. For image processing purposes, both a person and a thing may be an object, and an object may be a real object, something physically present, or a virtual object in an image displayed by the display device 2. Typically, virtual objects are displayed in three dimensions so that just as a user interacts with real objects in three dimensions, the user may interact with virtual objects in three dimensions. In some embodiments, image data captured from one or more depth cameras provides data for determining the three dimensional relationship of the user to objects, real and virtual, in the user field of view.

Figure 4:
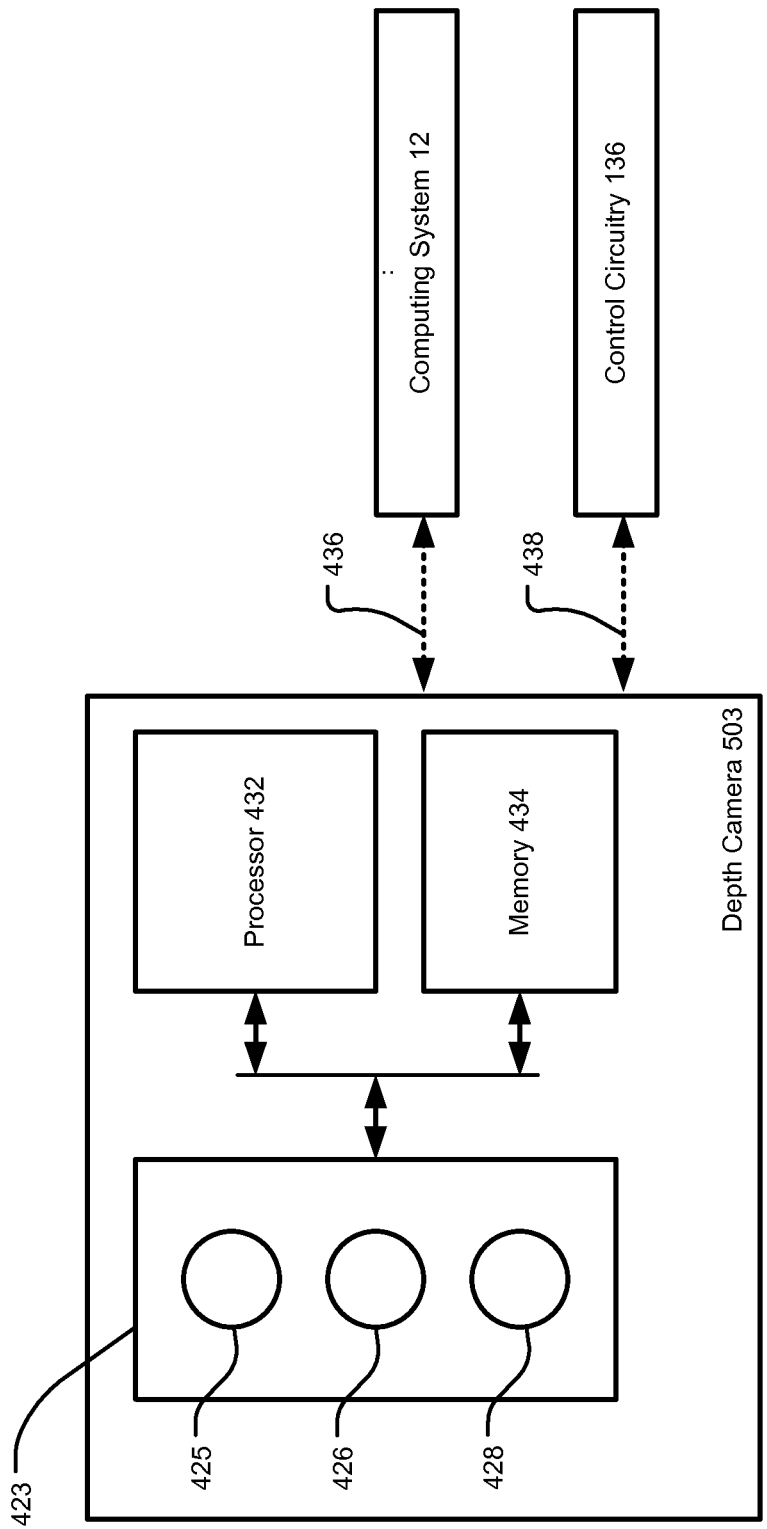
FIG. 4 illustrates an embodiment of a depth camera which may operate in a system embodiment of the technology.

FIG. 4 illustrates an embodiment of a depth camera 503. The outward, front or physical environment facing camera 113 may be embodied as a depth camera which sends images over a communication coupling 438 to the control circuitry 136 which in turn sends the images to the processing unit 4,5 for further processing locally or with the aid of a remote computer system 12. Additionally, as in FIG. 1A, capture devices 20A and 20B in the physical environment of the user may each or together embody a depth camera 503 for processing and sending depth data via a communication coupling 436 to a computer system 12 which may send data about object positions within a three-dimensional model of the environment over a network 50 to the processing unit 4,5. In some embodiments, a computing system 12 or the control circuitry 136 or the processing unit 4,5 may provide a clock to depth camera 503 that may be used to determine a rate of capture of image data, for example a frame rate of 30 frames a second.

According to an example embodiment, depth camera 503 may be configured to capture video with depth information including a depth image that may include depth values via any suitable technique including, for example, time-of-flight, structured light, stereo image, or the like. As shown in FIG. 4, depth camera 503 may include an image camera component 423 which may include an infrared (IR) light component 425, a three-dimensional (3-D) camera 426, and an RGB (visual image) camera 428 that may be used to capture the depth image of a scene.

The depth image may include a two-dimensional (2-D) pixel area of the captured scene where each pixel in the 2-D pixel area may represent a depth value such as a distance in, for example, centimeters, millimeters, or the like of an object in the captured scene from the camera. According to one embodiment, the depth camera 503 may organize the depth information into "Z layers," or layers that may be perpendicular to a Z axis extending from the depth camera along its line of sight. In other embodiments, gestures for device commands may be determined from two-dimensional image data.

According to another embodiment, in depth image processing, two or more physically separated cameras 503 may view a scene from different angles to obtain visual stereo data that may be resolved to generate depth information. For example, there may be an outward facing camera 113 on each side of frame 115, or each of the capture devices 20A and 20B may be located at different position in the room to capture image data of the room from different angles. Furthermore, depth cameras 503 in an environment, e.g. a place of business, may provide images as well as depth cameras 503 on HMD devices worn by users in the environment to a depth image processing application for creating and updating a three dimensional model of the objects within the environment. Other types of depth image sensors can also be used to create a depth image.

In an example embodiment, the depth camera 503 may further include a processor 432 that may be in communication with the image camera component 423 and executes instructions including, for example, instructions for receiving a depth image, generating the appropriate data format (e.g., frame) and transferring the data to a computing system, e.g. control circuitry 136 or hub computing system 12. Depth camera 503 may further include a memory 434 that may store the instructions that are executed by processor 432, images or frames of images captured by the 3-D camera and/or RGB camera, or any other suitable information, images, or the like.

As mentioned above, the depth camera 503 is in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection or wireless USB (WUSB) connection. The communication link 438 may be implemented as a wire connection which may connect a depth camera version of the outward facing camera 113 to the control circuitry 136 which forwards the image data to the processing unit 4,5 for further processing. Communication link 438 could also be wireless in some examples.

Software executing on one or more of the hardware components discussed above use the data provided by sensors such as the camera, orientation sensors and GPS sensor and network connections to track others and real and virtual objects in a user's environment.

Figure 5A:
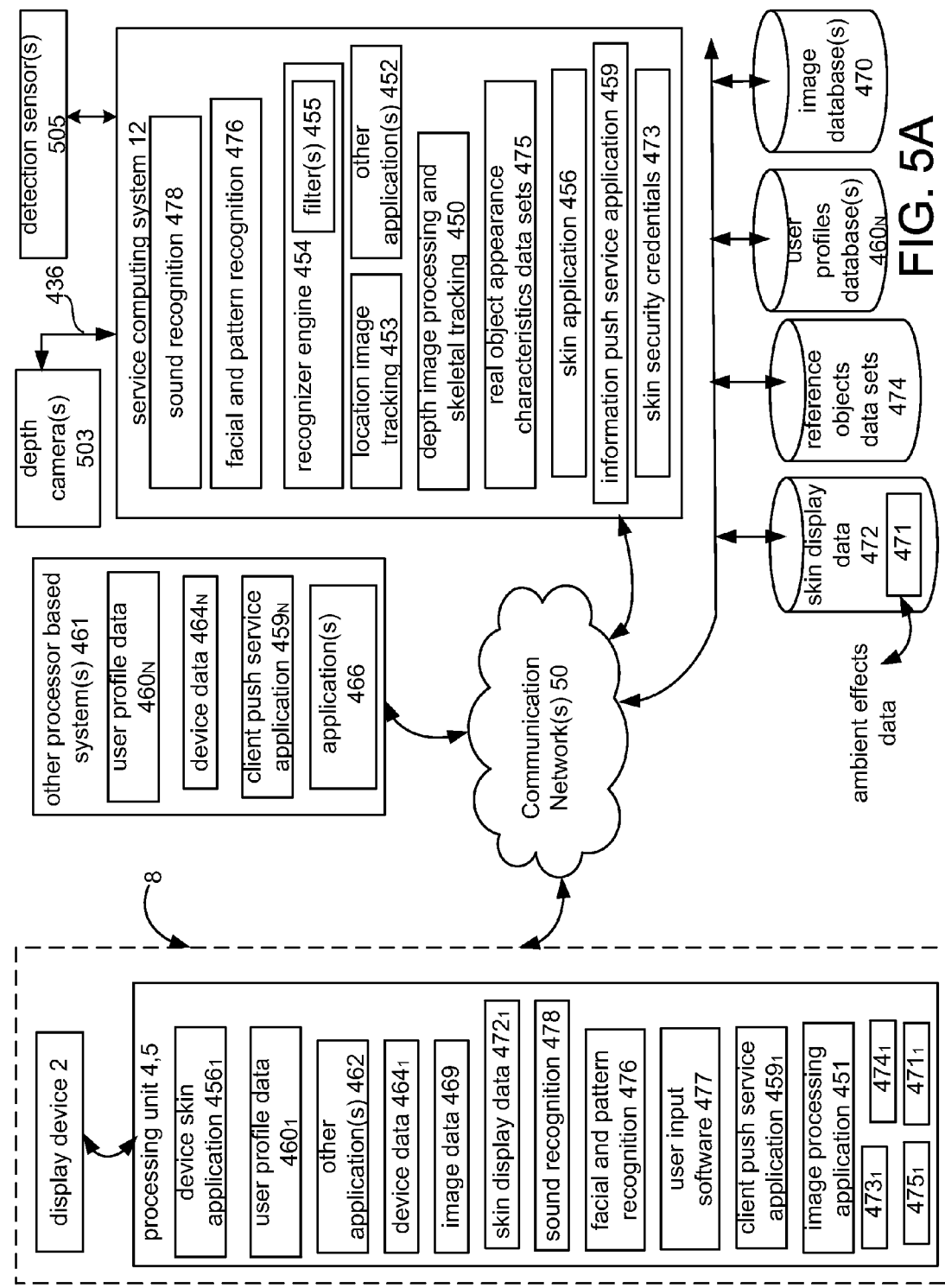
FIG. 5A is a block diagram of a system from a software perspective for providing a user interface with a virtual object appearing in context with a real environment of a user using a see-through, mixed reality display device system.

FIG. 5A is a block diagram of a system from a software perspective for providing a location-based skin to a see-through, mixed reality display device system. In this embodiment, a see-through, mixed reality display device system 8 executing a version of a skin application as a client side or device skin application $456_1$ is communicatively coupled over a network 50 to a computing system 12 executing another version of the skin application as a server side skin application 456. Often with the aid of the server side skin application 456, the client side or device skin application $456_1$ causes one or more skins for representing one or more virtual objects to appear as if physically present in the real world view of the display device system 8.

In this embodiment, each of the systems 8, 461 and 12 are communicatively coupled over one or more networks 50 to various databases discussed further below such as skin display data 472 with ambient visual effects data 471, reference object data sets 474, user profile databases $460_N$ and image database(s) 470.

Some examples of other processor based systems 461 are other see-through, mixed reality display device systems, other head mounted display systems, servers, mobile devices like mobile phones, smartphones, netbooks, notebooks, and the like and desktop computers. These other processor based systems 461 communicate with the display device system 8 to provide data in various multimedia formats like text, audio, image and video data, from one or more of its applications 466. For example, the data may be video of a friend at a same location at which the user is present, or a social networking page showing messages from others on the user's friend list. As discussed in examples below, such data may be incorporated in a skin accessible by the user and others as indicated by user settings in user profile data.

In this embodiment, another application provides additional data which may be incorporated in a skin based on data received from and sent to executing applications of a processor based system 461, an example of which is display system 8. The display device system 8 and the other processor based systems 461 execute a client side version of a push service application $459_N$ which communicates over a communication network 50 with an information push service application 459. A user may register an account with the information push service application 459 which grants the information push service permission to monitor the user's executing applications and data generated and received by them as well as user profile data $460_N$, and device data $464_N$ for tracking the user's location and device capabilities.

Trust levels may be determined by user profile data 460 which identifies people known to the user as social networking friends which may be subdivided into different groups based on trust levels. Additionally, the user may explicitly identify trust levels in their user profile using the client skin application $456_1$. In one embodiment, computing system 12 includes a user profile database $460_N$ which may aggregate data from user profile data stored on the different user computer systems 8, 461 of the user. The local copies of the user profile data may store some of the same user profile data 460 and may periodically update their local copies with the user profile data $460_N$ stored by the computer system 12 in an accessible database 460 over a communication network 50. Some examples of user profile data are the user's expressed preferences, the user's friends' list, the user's preferred activities, a list of the user's reminders, the user's social groups, the user's current location, and other user created content, such as the user's photos, images and recorded videos. In one embodiment, the user-specific information may be obtained from one or more applications and data sources such as the user's social networking sites, address book, schedule data from a calendar application, email data, instant messaging data, user profiles or other sources on the Internet as well as data directly entered by the user.

Each version of the push service application 459 also stores in user profile data 460 a tracking history of the user. Some examples of events, people and things tracked in the tracking history are locations visited, transactions, content and real things purchased, and people detected with whom the user has interacted. If electronically identified friends (e.g. social networking friends, contact lists) are registered with the push service application 459 too, or they make information available to the user or publicly through other applications 466, the push service application 459 can use this data as well to track the content and a social context for the user.

In many embodiments, the server side skin application 456 and the client side skin application $456_1$ verify a skin is from a trusted source based on security credentials 473. An example of a trusted source is a business at a location providing the skin. An example of an untrustworthy skin is a spoofed version or one infected with a virus or backdoor code to get at information stored on a user device system 8. Some examples of security credentials are a key or keys associated with each skin transferred and a digital signature of data of the skin using a key. Some examples of security measures which may be used with the credentials 473 are public-private key encryption, symmetric key encryption and digital signatures. The client side skin application $456_1$ can access locally stored security credentials $473_1$ for determining whether a skin received is trustworthy and for creating a secure version of a skin for transfer to another device.

Before discussing applying image data of a skin to a user field of view of a mixed reality device, a discussion of components for identifying real objects in a location and a user field of view is presented first. Computing system 12 may be implemented using one or more computer systems. In this example, the computing system 12 is communicatively coupled to one or more depth camera(s) 503 in a location for receiving three-dimensional (3D) image data of the location from which real objects and their positions in 3D can be identified. Furthermore, positions of virtual objects such as those associated with skins are identified and image data generated including them based on the received image data of the real world.

Additionally, the computing system 12 is also communicatively coupled to one or more detection sensors for identifying the presence of a see-through, mixed reality display device system in a location. There may be different types of detection sensors for different locations within a location. In many examples, a detection sensor is a wireless receiver or transceiver which detects a wireless signal from a mixed reality device and typically also transmits a wireless signal to the mixed reality device system. For example, a detection sensor may be a WiFi network access point. Based on picking up a wireless signal from a see-through, mixed reality display device system, the WiFi access point, produces packet headers for data from the mixed reality display device showing the set service identifier (SSID) of the access point. When the packets are received at a network interface of the computer system 12, which has stored the location of the WiFi access point within a building or geographically, the mixed reality display device is known to be within about 20 to 30 meters if indoors and 60 to 90 meters outdoors depending on antenna strength. Similarly cell tower triangulation may be used based on signals from the processing unit 4, e.g. when it is embodied as a mobile device 5, to identify a location of a mixed reality display device system with a 100 meters or so. Location identifier data identifying a location based on the triangulation is transmitted over a network to the computer system 12. Similarly, Global Positioning System (GPS) data may be obtained from the GPS transceiver 144 of the display device, or as disclosed in FIG. 16, from GPS transceiver 965 in the processing unit 5 for identifying a user within a range of 50 meters or so from a predetermined point in a location. The GPS location can be transmitted over a network to the computer system 12 as location identifier data. Such technology may be used to delineate a location by a geofence. A message may be sent from computer system 12 to the mixed reality display device system 8 when it has entered a geofence of a location.

Locations or spaces of smaller area may also be delineated or fenced by other types of wireless detection sensors. For example, a wireless universal serial bus (WUSB) may form a wireless connection with a mixed reality display device system 8 within approximately three to ten meters. Bluetooth may also be used and form wireless connections with display device systems at a distance of about 1 meter if desired or much higher such as 100 meters depending on the version of Bluetooth used and signal power used. For distances of less than a meter such as for a space about a person or a particular object, infrared signals may be used to exchange data for example using Infrared Data Association (IrDA) communication protocols. Depending on the implementing technology, RFID technology can provide a different detection distances as well. For example, some RFID technology can detect an object from less than a few centimeters while other technology can detect an object within 60 feet.

Of course, as discussed in examples below, image data from outward (from the user's head) facing cameras can be used to determine the user field of view. The cameras 113 are placed at a know offset from the optical axis 142 of each display optical system 14, so the offset can be applied to image data. Based on the resolution or focal length setting of the cameras 113, a distance to objects in the field of view can be determined. For example, as the edges of a doorway approach, and move to the edges of a field of view, a distance to the doorway may be estimated, and user movement towards the doorway identified, a first skin, perhaps an advertisement skin for other skins to be experienced inside, may be being transmitted by the server side application and downloaded by the client side skin application 456$_1$. Based on a distance perimeter to the doorway in the metadata of the skin, the client side skin application 456$_1$ on the device determines from the image data and camera settings whether the user wearing the device is within the distance perimeter. If so, the skin is displayed by the user's mixed reality display device. In one example, image data from the cameras 113 may be uploaded to the computer system 12, which monitors the image data for identifying at least one of a set of objects which based on the cameras focal length settings indicate the user has entered the location. Once the user has entered the location, the device skin application receives object identifiers for real objects or space identifiers based on a 3D model of the space updated by the depth image processing and skeletal tracking software 450 and receives one or more skins for the location, each with metadata indicating a real object identifier, a space identifier or both which trigger display of the respective skin.

As described further below, real objects are identified in image data and their appearance characteristics are stored, for example as real object appearance characteristics data sets 475 which are accessible over a communication network 50 from computer system 12. A local version of these data sets or a subset 47$_{S1}$ may also be stored on the display device system 8. Reference object data sets 474 provide categories of appearance characteristics tied to different types of objects, and these reference object data sets 474 may be used to recognize objects in image data, and also to select appearance characteristics of virtual objects so they look realistic.

Figure 5B:
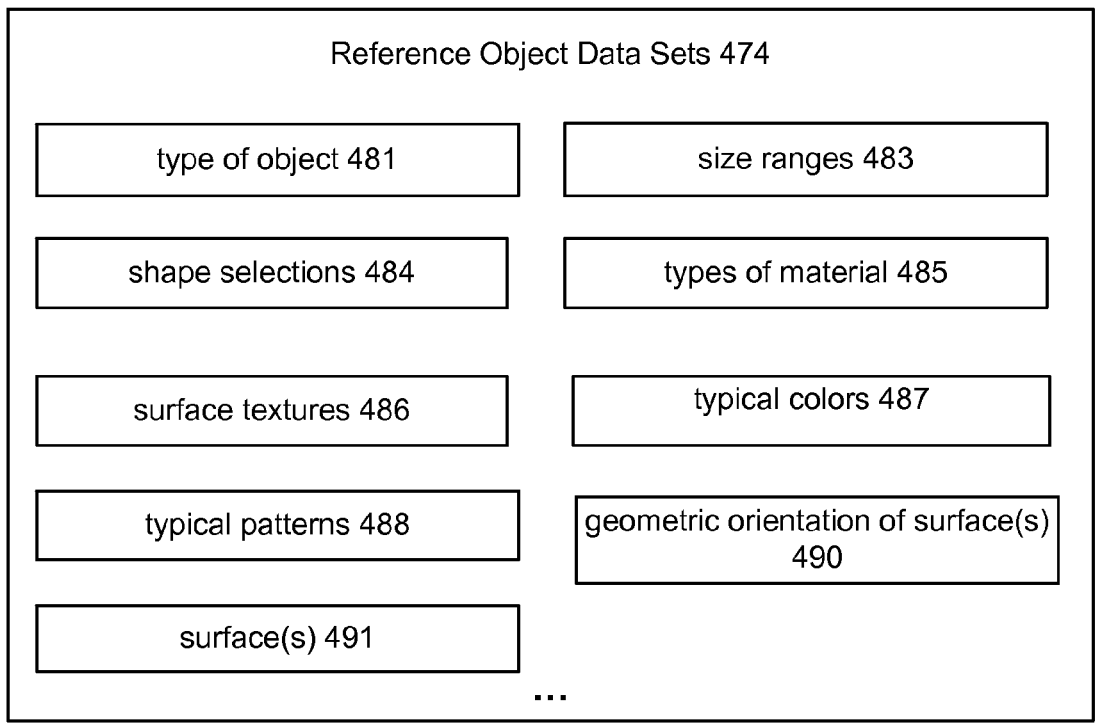
FIG. 5B illustrates an example of a reference object data set.

FIG. 5B illustrates an example of a reference object data set. The data fields include a type of object 481 which may be a data record which also includes sub-fields. For the type of object 481, the other data fields provide data records identifying the types of appearance characteristics typical for the type of object. For example, the other data records identify size ranges 483, shape selections 484, types of material 485, typical colors 487, typical patterns 488, surface(s) 491, surface texture(s) 486, and a geometric orientation of each surface 490.

In an example of a desk as the type of object, a sub-field of the type of object may be selected as office desk. The size ranges 483 may range from typical values of 4 to 6 feet in width, 2 to 4 feet in length and 2 to 4 feet in height. Colors available may be brown, silver, black, white, navy blue, beige, or gray. Someone may have a red office desk, so the reference appearance characteristics typically provide commonly found or average parameters. The surfaces 491 may include a flat surface which the geometric orientation 490 indicates as horizontal. Vertical surfaces may also be noted from the image data of desk. The surface texture 486 for the flat surface may be smooth and the patterns available 488 may indicate wood grain, and vinyl reflective. Types of wood grain patterns may be sub-fields or sub-records to the patterns available 488 record.

As mentioned above, the reference object data sets 474 also provide input parameters for defining the appearance characteristics of a virtual object of a skin. In one embodiment, skin display data 472 may define types of virtual objects and their appearance characteristics for rendering by the microdisplay 120 of the display device 2. For example, these reference objects 474 may be considered templates and parameters for appearance characteristics of virtual objects. For display data 472, specific data values, e.g. a specific color and size, are selected in an instantiation of a template for generating the actual virtual object to be displayed. For example, a class may be defined for each type of object, and the skin application at runtime instantiates a virtual object of the respective class with the parameters for the appearance characteristics of size, type of material, color, pattern, surface texture, shape parameters, and geometric orientations of each surface and the object. The skin display data 472 may be implemented in a markup language. For example, Extensible Markup Language (XML) may be used. In another example, a markup language like Virtual Reality Modeling Language (VRML) may be used.

Figure 5C:
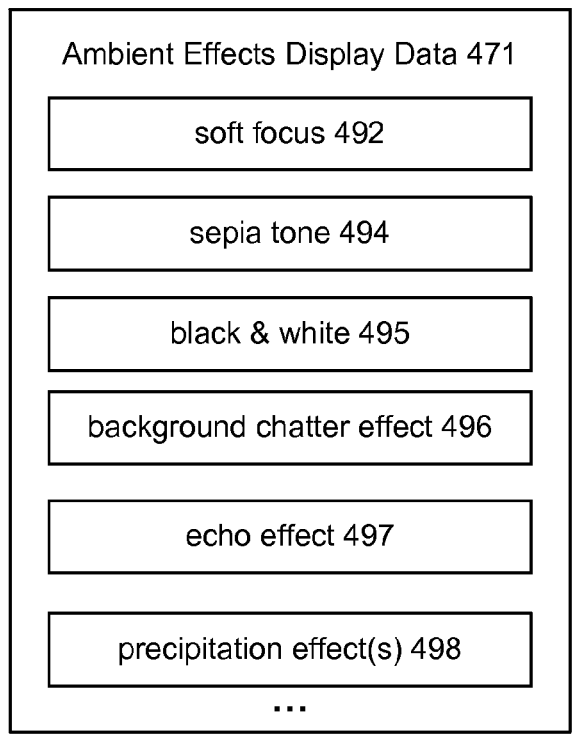
FIG. 5C illustrates some examples of ambient visual effects data.

FIG. 5C illustrates some examples of ambient effects display data 471, a subset of the skin display data 472. Some examples of such ambient effects display data 471 are visual effects of soft focus 492, sepia tone 494, and black and white 495 as well as audio effects such as a background chatter effect 496 of people talking and echo effects 497. Other effects may be defined as well such as sounds of weather and one or more precipitation effects 498. If it is raining and a virtual object is to be displayed on a wall outside, for example, the skin display data 474 may be selected to include a rain effect, so when the opacity filter 114 blocks out a portion of the real world view for overlay by the virtual object, the virtual object on the wall will also be receiving the rain like the real objects in the view.

For certain skin visual effects like soft focus or a color effect image data may track the edges of real objects in a scene to provide the soft focus effect. In other examples such as black and white, rose colored or blue tone, and sepia tone, the virtual objects appearance characteristics are selected to match the visual effect. In some examples, real objects are tracked and image data overlaid on real objects to modify colors to appear in the visual effect, e.g. black and white and sepia tone. In other examples, the opacity filter may also implement color filter effects, e.g. seeing the world through rose colored glasses, so light from the real world view is filtered when it reaches the user's eyes in a similar manner as a color filter over a camera sensor causes a color effect in the resulting photograph.

For some skin visual effects like sepia tone and black & white of both real and virtual objects, in some embodiments, the opacity filter 114 may block the actual direct view entirely putting the see-through, mixed reality display device in a video see mode. Image data of the real world scene from the front facing cameras 113 is digitally processed to change colors, for example to the grayscale for black and white photography or to the sepia tones for a sepia tone effect. Virtual objects for insertion in the user field of view are matched based on lighting and shadow effects to appear with the same ambient visual effect. The resulting image data is displayed by the display optical systems 14 showing the ambient visual effect.

The image processing application 451 of the see-through, mixed reality display device system 8 will format skin display data 472 received via the device side skin application 456$_1$ to a format which can be processed by the image generation unit 120, e.g. the microdisplay 120, and provide instructions to the opacity controller 224 for the opacity filter 114, if used.

In the example of FIG. 5A, the see-through, mixed reality display device system 8, user profile data 460$_1$, and other applications 462 as well as device data 464. Device data 464 may include a unique identifier for the computer system 8, a network address, e.g. an IP address, model number, configuration parameters such as devices installed, the operation system, and what applications are available in the display device system 8 and are executing in the display system 8 etc. Particularly for the see-through, mixed reality display device system 8, the device data may also include data from sensors or determined from the sensors like the orientation sensors 132, the temperature sensor 138, the microphone 110, the electrical impulse sensor 128 if present, and the GPS transceiver 144. Image data 469 is also stored and may include images for analysis remotely by the computing system 12, and images to be displayed by the display optical systems 14 of the display device 2.

Sound recognition software 478 may be used to interpret commands or identify nearby users. Facial and pattern recognition software 476 may also be used to detect and identify users in image data as well as objects in image data. User input software 477 can receive data identifying physical actions like gestures, particular spoken commands or eye movements for controlling an application. The one or more physical actions may indicate a response or request of a user with respect to a real or virtual object.

The applications 450, 456, and 459 of the computing system 12 may also communicate requests and receive data from server side versions of sound recognition software 478 and facial and pattern recognition software 476 in identifying users and other objects in a location space.

The block diagram also represents software components for recognizing physical actions in image data which is discussed further below. Furthermore, the image data plus sensor data available is processed for determining positions of objects, including other users, within a user field of view of the see-through, near-eye display device 2. This embodiment illustrates how the various devices may leverage networked computers to map a three-dimensional model of a user field of view and the surrounding space and the real and virtual objects within the model. An image processing application 451 executing in a processing unit 4,5 communicatively coupled to a display device 2 can communicate image data 469 from front facing camera 113 over one or more communication networks 50 to a depth image processing and skeletal tracking application 450 in a computing system 12 for processing of image data to determine and track objects, which include both people and things, in three dimensions. In some embodiments, additionally, the image processing application 451 may perform some processing for mapping and locating objects in a 3D user space locally and may interact with the location image tracking application 453 for receiving distances between objects. Many combinations of shared processing are possible between the applications by leveraging network connectivity.

A depth image processing application 450 detects objects, identifies objects and their locations in the model. The application 450 may perform its processing based on depth image data from depth cameras 503 like 20A and 20B, two-dimensional or depth image data from one or more front facing cameras 113, and images obtained from databases 470. The image databases 470 may include reference images of objects for use in pattern and facial recognition (e.g. as may be performed by software 476). Some of the images in one or more of the databases 470 may also be accessed via location metadata associated with objects in the images by a location image tracking application 453. Some examples of location metadata include GPS metadata, location data for network access points like a WiFi hotspot, and location data based on cell tower triangulation.

The location image tracking application 453 identifies images of the user's location in one or more image database (s) 470 based on location data received from the processing unit 4,5 or other location units (e.g. GPS units) identified as being within a vicinity of the user, or both. Additionally, the image database(s) may provide images of a location uploaded by users who wish to share their images. The database may be indexed or accessible with location metadata like GPS data, WiFi SSID, cell tower based triangulation data, a WUSB port location, or a position of an infrared transceiver. The location image tracking application 453 provides distances between objects in an image based on location data to the depth image processing application 450.

The tracking information from the depth image processing and skeletal tracking application 450, the image processing software 451 or both is provided to either or both of the server and client skin applications 456 and 456₁. Application 456 provides the tracking information, audio data and visual image data to recognizer engine 454. In another embodiment, recognizer engine 454 receives the tracking information directly from depth image processing and skeletal tracking module 450 and receives the audio data and visual image data directly from the processing unit 4,5, the capture devices 20A and 20B, or both.

Depth cameras 503 (e.g. capture devices 20A and 20B or front facing cameras 113) provide RGB images (or visual images in other formats or color spaces) and depth images to hub computing system 12. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety.

The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. Patent Applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 455 to determine a gesture or action that may be performed by any person or object detectable by a depth camera 503. Such gestures may be a method of interaction for a user to provide input to the skin application. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made. In some instances, two-dimensional image data is only available. For example, the front facing cameras 113 only provide two-dimensional image data. From the device data 464, the type of front facing camera 113 can be identified, and the recognizer engine 454 can plug in two-dimensional filters for its gestures.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated herein by reference in their entirety.

References to front facing image data are referring to image data from one or more front facing cameras like camera 113 in FIGS. 2A and 2B. In these embodiments, the field of view of the front facing cameras 113 approximates the user field of view as the camera is located at a relatively small offset from the optical axis 142 of each display optical system 14, and the offset is taken into account in processing the image data.

Figure 6A:
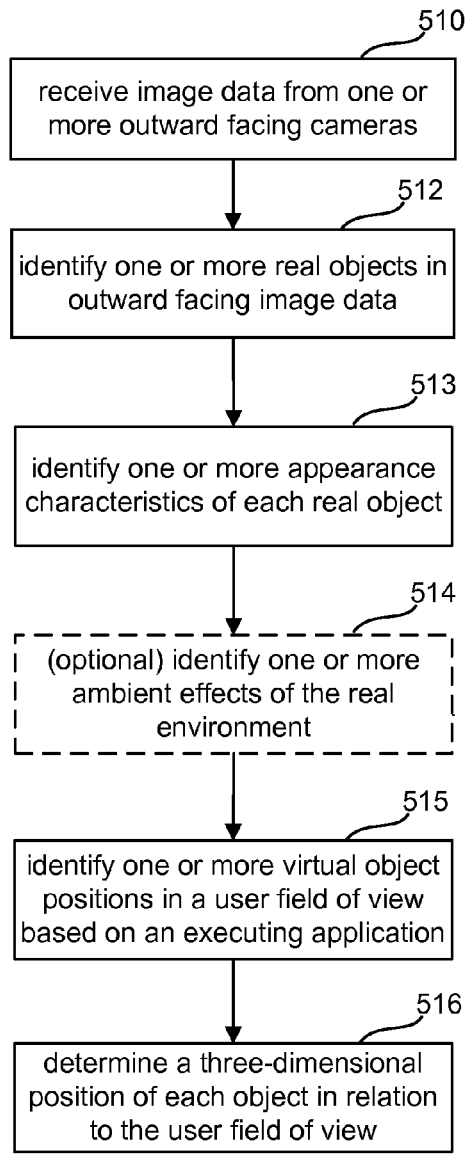
FIG. 6A is a flowchart of a method embodiment for determining a three-dimensional user field of view.

FIG. 6A is a flowchart of a method embodiment for determining a three-dimensional user field of view. In step 510, one or more processors of the control circuitry 136, the processing unit 4,5, the hub computing system 12 or a combination of these receive image data from one or more front facing cameras, and in step 512 identify one or more real objects in front facing image data. In some embodiments, front facing image data is three-dimensional image data. Data from the orientation sensor 132, e.g. the three axis accelerometer 132C and the three axis magnetometer 132A, can also be used with the front facing camera 113 image data for mapping what is around the user, the position of the user's face and head in order to determine which objects, real or virtual, he or she is likely focusing on at the time. The facial and pattern recognition software 476 may identify objects of people and things by comparison with reference object data sets 474 and actual images stored in image data 470.

In step 513, the one or more processors executing the facial and pattern recognition software 476 also identify one or more appearance characteristics of each real object such as type of object, size, surfaces, geometric orientation, shape, color, etc. Optionally, the recognition software 476 identifies one or more ambient effects of the real environment. Based on an executing application, the one or more processors in step 514 identify virtual object positions in a user field of view based on executing applications. In step 516, a three-dimensional position is determined for each object in the user field of view. In other words, where each object is located with respect to the display device 2, for example with respect to the optical axis 142 of each display optical system 14.

Figure 6B:
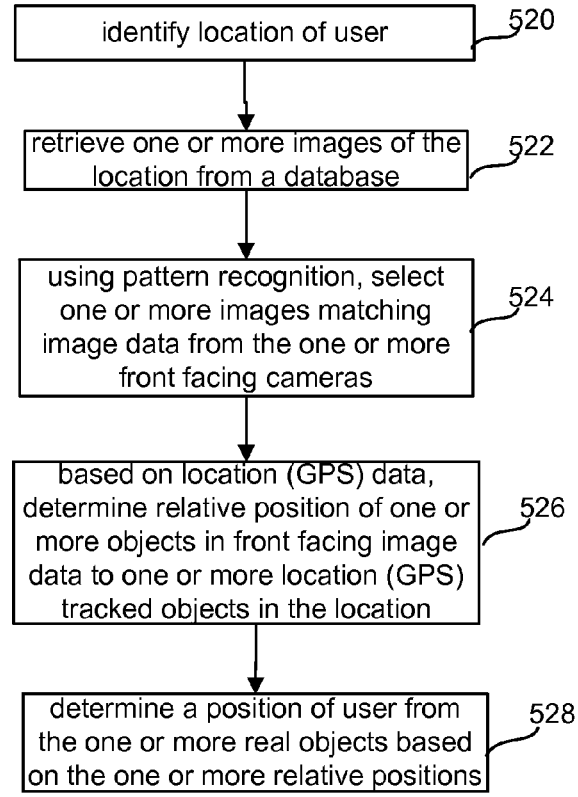
FIG. 6B is a flowchart of a method embodiment for identifying one or more real objects in a user field of view.

FIG. 6B is a flowchart of a method embodiment for identifying one or more real objects in a user field of view. This embodiment may be used to implement step 512. In step 520, a location of user wearing the display device 2 is identified. For example, GPS data via a GPS unit 965 (see FIG. 16) in the mobile device 5 or GPS transceiver 144 on the display device 2 may identify the location of the user. Additionally, an IP address of a WiFi access point or a cellular station to which the display device system 8 has a connection can identify a location. Cameras at known positions within a location may identify the user through facial recognition. Additionally, identifier tokens may be exchanged between display device systems 8 via infrared, Bluetooth, RFID transmission, or WUSB. The range of the infrared, RFID, WUSB or Bluetooth signal can act as predefined distance for determining proximity of another user.

In step 522, one or more processors, retrieve one or more images of the location from a database (e.g. 470), and uses facial and pattern recognition software 476 in step 524 to select one or more images matching image data from the one or more front facing cameras 113. In some embodiments, steps 522 and 524 may be performed remotely by a more powerful computer, e.g. hub 12, having access to image databases. Based on location data (e.g. GPS data), in step 526 the one or more processors determines a relative position of one or more objects in front facing image data to one or more GPS tracked objects 528 in the location, and determines in step 529 a position of a user from the one or more real objects based on the one or more relative positions.

Figure 6C:
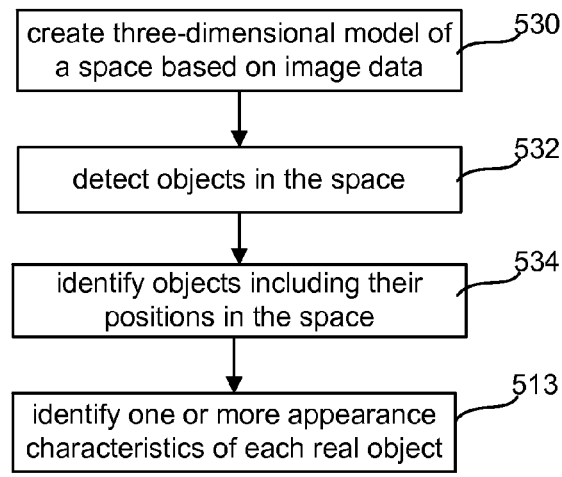
FIG. 6C is a flowchart of a method embodiment for generating a three-dimensional model of a user space.

In some embodiments such as in FIG. 1A, a user wearing a see-through, near-eye, mixed reality display may be in a location in which depth image processing software 450 of a computer system 12 provides a three-dimensional mapping of objects within a space, e.g. a store. FIG. 6C is a flowchart of a method embodiment for generating a three-dimensional model of a user space. In step 530, a computer system with access to depth cameras like hub system 12 with capture devices 20A and 20B creates a three-dimensional model of a space based on depth images. The depth images may be from multiple perspectives and may be combined based on a common coordinate space, e.g. the store space, and creates a volumetric or three dimensional description of the space. In step 532, objects are detected in the space. For example, edge detection may be performed on the depth images to distinguish objects, including people, from each other. In step 534, the computer system 12 executing the facial and pattern recognition software 476 identifies one or more detected objects including their positions in the space, and identifies in step 513 one or more appearance characteristics of each real object. The objects may be identified based on pattern recognition techniques (476) including facial recognition techniques (476) with reference images of things and people from image databases 470 and the reference object data sets 475.

The image processing software 451 can forward front facing image data and sensor data to the depth image processing software 450 and receives back from the computer system 12 three-dimensional positions and identifications including appearance characteristics from the facial and pattern recognition application 476 executing on computer system 12. In this way, the skin application $456_1$ can determine which real objects are in the user field of view and which real objects are not currently in the user field of view, but which are in the 3D modeled space. Real objects may be assigned real object identifiers by the depth image processing and skeletal tracking software 450. In turn, in some examples, the server side skin application 456 can identify in meta data for each skin the real object identifier for a real object in the 3D modeled space to which the skin is attached.

Each of the method embodiments of FIGS. 6A through 6C are typically performed repeatedly as the user and objects within the user's environment move around.

For illustrative purposes, the method embodiments below are described in the context of the system embodiments described above. However, the method embodiments are not limited to operating in the system embodiments described above and may be implemented in other system embodiments.

Figure 7A:
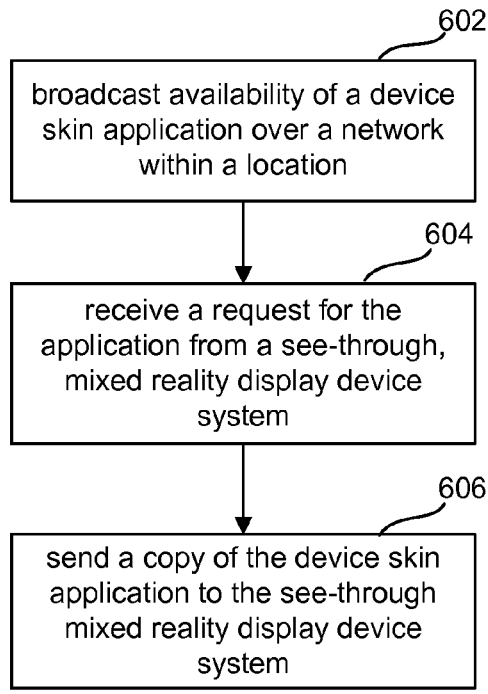
FIG. 7A is a flowchart of a method embodiment for distributing software for displaying a skin to one or more see-through, mixed reality display device systems in a location.

FIG. 7A is a flowchart of a method embodiment for distributing software for displaying a skin to one or more see-through, mixed reality display device systems in a location. In step 602, the skin application 456 broadcasts availability of a device or client skin application $456_1$ over a network within a location, and in step 604 receives a request for the application from a see-through, mixed reality display device system. In step 606, the server side skin application 456 sends a copy of a device skin application to the see-through mixed reality display device system.

Figure 7C:
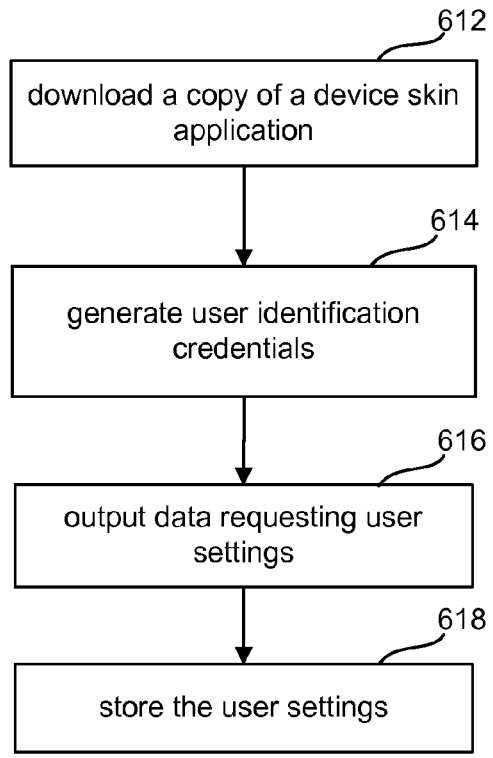
FIG. 7C is a flowchart of a method embodiment for initializing software for displaying a skin executing in a see-through, mixed reality display device system.
Figure 7B:
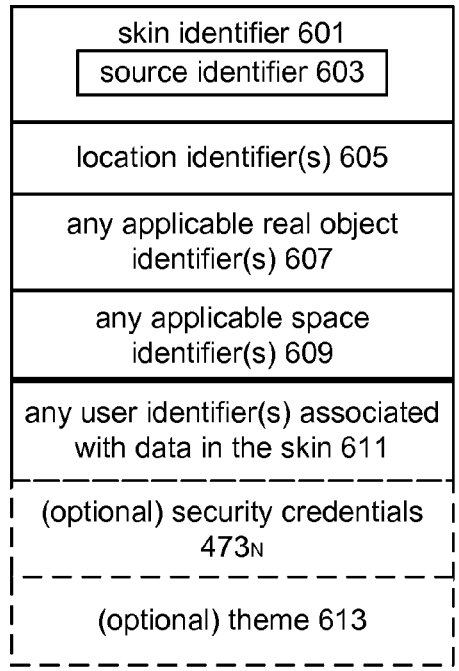
FIG. 7B illustrates an example of metadata for a skin.

FIG. 7B illustrates an example of metadata for a skin. The skin metadata in this example includes a skin identifier 601. In many examples, the skin identifier 601 is unique for the skin and also includes a source identifier 603 of the skin, e.g. another user or a business or other entity which controls a location. One or more location identifiers 605 may be associated with the skin. For example, a skin may be associated with a location within a location. Some examples of skin display parameters are also included. One example is one or more real object identifiers 607, if any, of one or more real objects which the skin tracks. Another example is a space identifier 609, if any, for identifying a specific space within the location in which the skin appears if the space is in the user field of view. For skins incorporating user data, the metadata may include one or more user identifiers 611 associated with any user content in a skin.

Depending on the security scheme used for authenticating the source of the skin, skin security credentials $473_N$ may also be stored in skin metadata, for example a public key and nonce for an asymmetric key encryption scheme. The security credentials $473_N$ are listed as optional as key data may be stored in the client skin application data, for example a symmetric key for decryption. Optionally, a theme 613 for the skin may be included in the metadata which as disclosed in an example below may be used to filter data output by other applications executing in the see-through, mixed reality display device system based on the theme.

FIG. 7C is a flowchart of a method embodiment for initializing software for displaying a skin executing in a see-through, mixed reality display device system. The display device system 8 downloads a copy of a client or device skin application in step 612 and generates in step 614 user identification credentials. In step 616, the client skin application $456_1$ outputs data, for example a menu, requesting user settings. The user settings may indicate settings for all skins received or sent, or the user may request to input settings for each individual skin. The user settings identify who may see user data transferred for incorporation into a location based skin by a skin application 456 executing on a computer system 12 associated with a location. For example, video data of the user dancing at "Le Club" may have a setting identifying users only on the friends list of the user, or even a group or level within the friends list. The user may also identify users by specific selection, e.g. selection from a contact list or text entry of the name. Some examples of default user settings may be all for skins received, and pubic for skins sent meaning available to everyone using a see-through, mixed reality display device system 8 in a location. In step 618, the device skin application $456_1$ stores the user settings in user profile data 460 which may be stored locally on the device system 8 or in a network accessible datastore, e.g. $460_N$, or both.

As described further below, a first see-through mixed reality display device system 8 may also transfer a skin to a second see-through mixed reality display device system 8 within a perimeter, for example, within a personal space perimeter of the user wearing the first mixed reality device system 8. The user settings may also indicate who is eligible to receive skins from the user of the first device system. Additionally, the second display device system 8 may have user settings indicating from whom a skin may be received. For example, the second system 8 may have user settings to only receive a skin from another display device system 8 to which a user designated on a friend list is logged in.

Figure 8A:
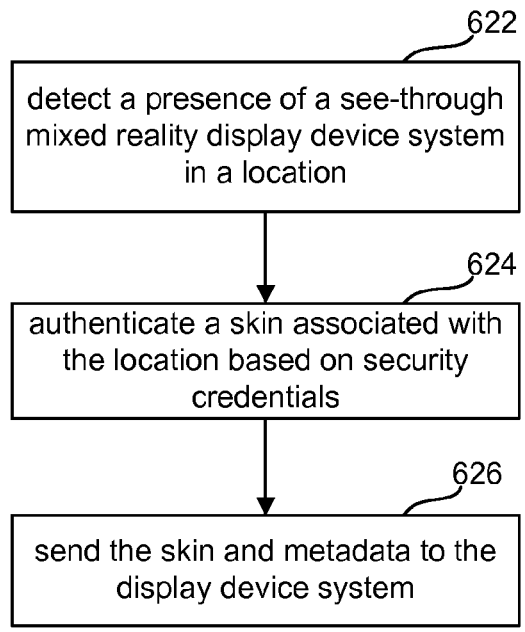
FIG. 8A is a flowchart of a method embodiment for providing a location-based skin to a see-through, mixed reality display device system.

FIG. 8A is a flowchart of a method embodiment for providing a location-based skin to a see-through, mixed reality display device system. In step 622, the skin application 456 detects a presence of a see-through mixed reality display device system in a location. As discussed above, this may be based on data received via one or more sensors of wireless signals or even from image data for a user field of view captured from front facing cameras 113 in some examples. In step 624, the skin application 456 providing the skin authenticates a skin associated with the location based on security credentials. For example, the display data of the skin, e.g. the instructions in a markup language which the display device system 8 can process to generate the display of the skin, may be encrypted and security credentials of a public key and a nonce stored as security credentials 473 in the metadata for the skin. In another example, the display data of the skin may be signed with a key which the client application has as part of its application data or for which security credentials of a public key and a nonce are also provided. Other security schemes for authenticating the source of the skin may also be used. In step 626, the skin application 456 sends the skin and metadata to the display device system.

Figure 8B:
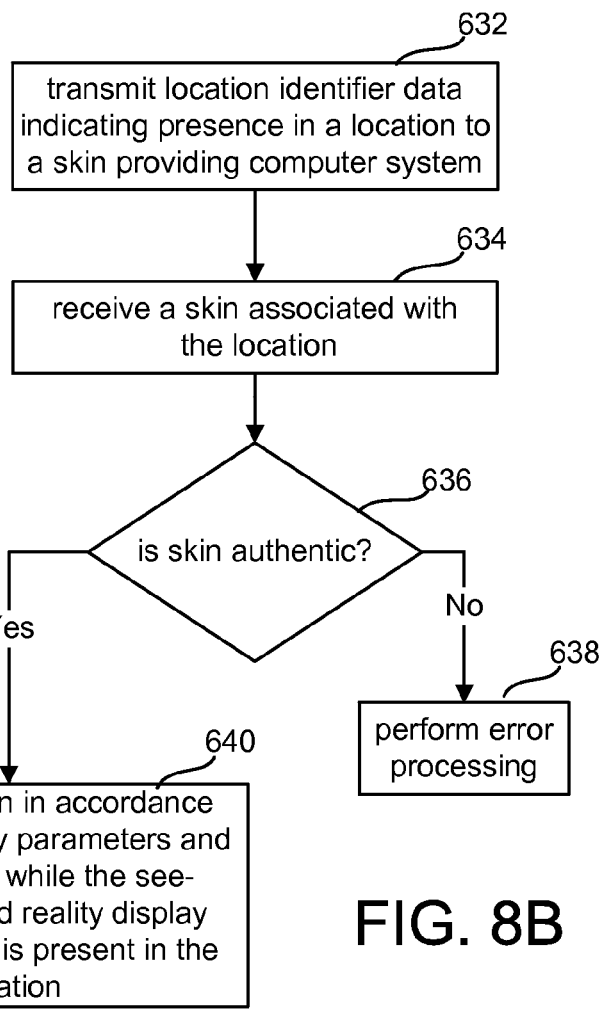
FIG. 8B is a flowchart of a method embodiment for displaying a location-based skin by a see-through, mixed reality display device system.

FIG. 8B is a flowchart of a method embodiment displaying a location-based skin by a see-through, mixed reality display device system. The client side application $456_1$ in step 632 transmits location identifier data indicating presence in a location to a skin providing computer system. For example, the device application may transmit a message with an SSID of a wireless access point identified with a specific location, or a location identifier token or data set including user identification data, and a transceiver identifier with a timestamp of an infrared transceiver responsive to receiving a token or dataset from the transceiver which provided the transceiver identifier including the stamp. The skin providing computer system skin application 456 detects the location of the display device system 8 based on the location of the transceiver identified in the transceiver identifier.

The device skin application $456_1$ in step 634 receives a skin associated with the location and determines in step 636 authenticates the skin, for example base on whether the security credentials are valid. For example, the device skin application verifies a digital signature or performs a decryption algorithm based on a symmetric or private key stored locally as security credentials $473_1$. If the skin fails the authentication test, the device skin application $456_1$ in step 638 performs error processing. For example, the device skin application may send an error message to the skin application providing the skin and not execute the display data for the skin. In step 640, responsive to the skin being authenticated as valid, the display device skin application $456_1$ displays the skin in accordance with skin display parameters in the skin metadata and user settings from user profile data 4601.

FIG. 8C is a flowchart of another method embodiment for providing a location-based skin to a see-through, mixed reality display device system. In this example, metadata is sent and the associated skin sent in response to a request. After step 622 of detecting a presence of a see-through mixed reality display device system in a location, the server skin application 456 in step 623 sends metadata of a skin associated with the location to the display device system. Responsive to receiving a request for the skin in step 625, the server skin application 456 authenticates the skin associated with the location with security credentials in step 627 and sends the skin to the display device system in step 629.

FIG. 8D is a flowchart of another method embodiment for displaying a location-based skin by a see-through, mixed reality display device system. In step 632, the client skin application $456_1$ transmits location identifier data indicating presence in a location to a server skin application 456 executing on a skin providing computer system, and in step 633 receives metadata of a skin associated with the location. In step 635, the client skin application $456_1$ determines whether user settings authorize the skin to be displayed. For example, the user settings may limit skins to those from identified sources. If the source identified in the source identifier 603 does not match an authorized source in user settings, the skin is not requested and processing ends as in step 637. Other user settings may also authorize or prohibit requesting the skin. For example, the user settings may have the skin identifier 601 on a "do not download" list.

Figure 10:
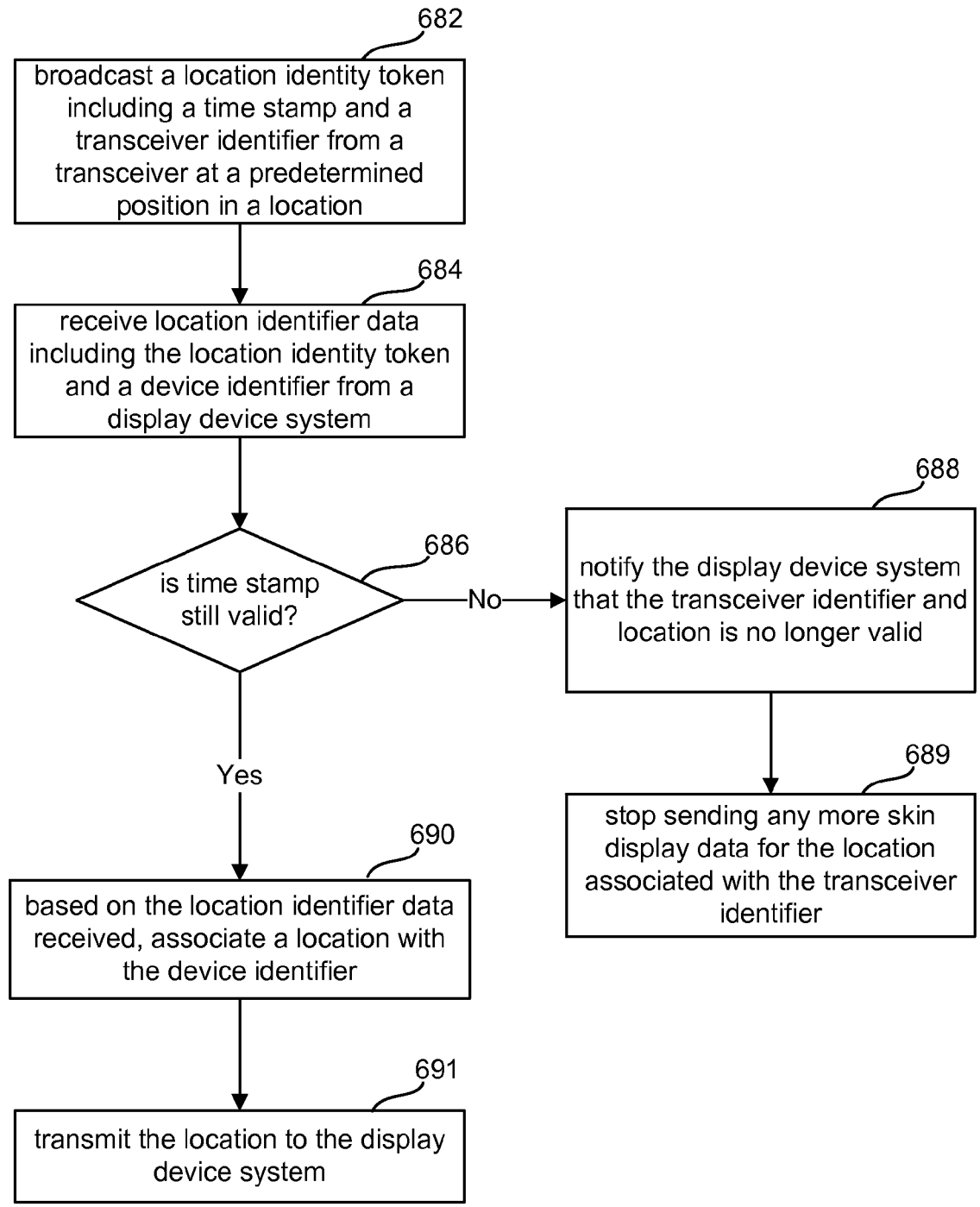
FIG. 10 is a flowchart of an implementation method example of detecting a presence of the see-through mixed reality display device system in a location.

In step 639, responsive to the user settings authorizing the skin to be displayed, the client skin application $456_1$ requests the skin associated with the location, and in step 640, receives the skin associated with the location. In step 641, whether the skin is valid or authenticated as coming from the source in the source identifier 603 unmodified is determined based on security credentials. If the skin is determined to not be valid, the client skin application $456_1$ in step 642 performs error processing. Some examples of error processing are sending an error message and deleting any skin data received. If the skin is authenticated as valid, in step 643, the client skin application $456_1$ displays the skin in accordance with skin display parameters and user settings while the display device system is present in the location. FIG. 10 below provides an example of determining when a display device system enters and exits a location.

FIG. 9A is a flowchart of a method embodiment for displaying user data from other users in accordance with user settings. In step 654, the client skin application $456_1$ determines whether user settings authorize displaying user data for any user identified by a user identifier 611 associated with data in the skin 655. For example, a skin may incorporate video data, messages, image data with a virtual object, etc. of people who are or have been in the location. A user may wish to see messages or other data limited to those on his or her friend's list, a subset, group or level of such list or a list of user names entered by the user. A user may also indicate "none" or another selection indicating no user data is to be incorporated in the skin. If user settings do not authorize the user data received for incorporation into the skin, the client skin application $456_1$ displays the skin without user data in step 655. If user settings do authorize the incorporation of the user data, the client skin application $456_1$ incorporates the user data of any user authorized by the user settings into the display data of the skin while the display device system is present in the location in step 656, and in step 657 displays the skin with the incorporated user data while the display device system 8 is present in the location.

As mentioned above, the skin display data may be provided in a markup language using a scheme for identifying objects and positions in the user field of view. The display data for a skin may provide a template or class for a virtual object which allows references to a file, e.g. an image file or text file or audio file, which can be pulled in as the code is executing. For example, if one of the skins shows photo streams taken of the crowd at the location, a reference to a user photo file can be input as a parameter in a virtual object created for the skin.

FIG. 9B is a flowchart of a method embodiment for sending user data for incorporation into a skin. In step 662, the client skin application 456₁ displays user data which may be uploaded for incorporation into a skin and determines in step 664 whether user input authorizes the upload of the user data. An example of user data displayed to the user is image data from the skin application 456 showing the user with one or more virtual objects worn or overlaid on image data of the user for others to see when in the location. Some other examples of the user data may also be a message like a Tweet®, video data of the user at the location, video data of the user with his avatar overlay at the location, or information from user profile data 460 such as a resume during a professional event at the location or a personal summary for a matchmaking event at the location.

If the user does not wish user data to be uploaded for incorporation into a skin, the client skin application 456₁ in step 667 ends processing for the user data. If user input authorizes upload of the data, in step 668, the client skin application 456₁ requests and receives user recipient settings for the user data and optionally, an expiration time for the user data. The expiration time is for preventing stale data from being incorporated in a skin. The user recipient settings identify other users who may view the incorporated user data in the skin at the location. The user recipient settings may be by category, or specific user identifiers. For example, all may be a category, friend's list or subset there of may be a category or engineering employers at a job event at the location may also be a category.

In step 669, the client skin application 456₁ authenticates the user data with security credentials 473₁ and in step 670, sends the user data with the user identification, user recipient settings and security credentials to the skin providing computer system if the display device system is still present in the location.

Figure 9C:
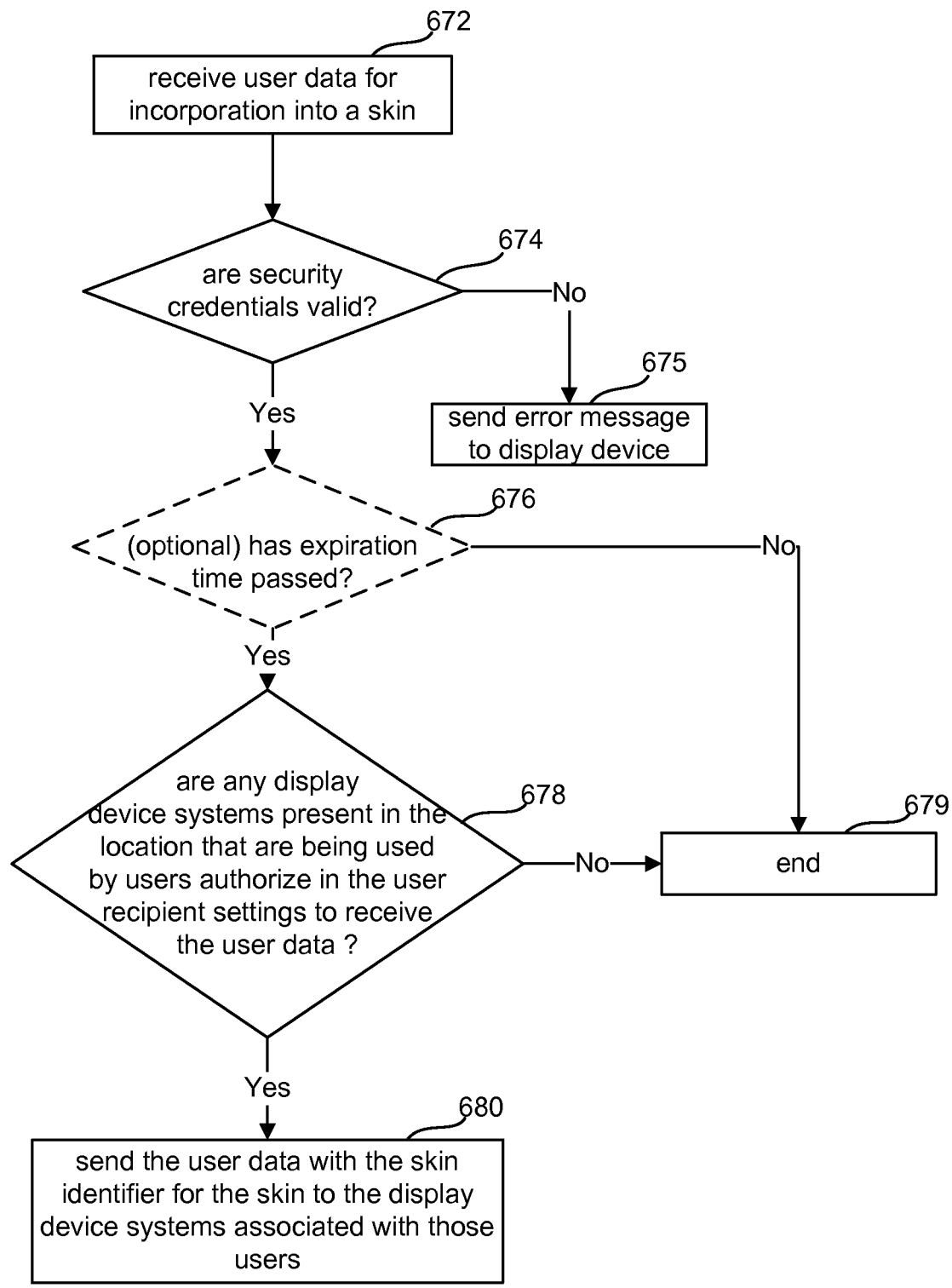
FIG. 9C is a flowchart of a method for incorporating user data into a skin.

FIG. 9C is a flowchart of a method for incorporating user data into a skin. In step 672, the server skin application 456 executing on the skin providing computer system 12 receives user data for incorporation into a skin from a client skin application 456₁ executing in a display device system 8 and determines in step 674 whether the security credentials for the user data are valid. If not, the skin application 456 sends an error message in step 675 to the display device system which sent the user data. If the security credentials are valid, optionally in step 676, the server skin application 456 determines whether an expiration time for the user data set by the user has passed. If so, no further action is taken to incorporate the user data in the skin in step 679. If the credentials are valid, and optionally if the expiration time has not passed, the skin application 456 determines whether any display device systems are present in the location that are being used by users identified in the user recipient settings. If not, no further action is taken to incorporate the user data in the skin in step 679. If it is determined in step 678 that one or more users authorized in the user recipient settings to receive user data are using display devices present in the location, in step 680 the server skin application 456 sends the user data with the skin identifier for the skin to the display device systems 8 associated with those users.

FIG. 10 is a flowchart of an implementation method example of detecting a presence of the see-through mixed reality display device system in a location. A detection sensor embodied as a wireless transceiver in step 682 broadcasts a location identity token including a time stamp and a transceiver identifier from the transceiver at a position in a location. Some examples of such a transceiver is a WiFi access point, an infrared, WUSB, RFID or Bluetooth transceiver. In step 684, the skin application 456 receives location identifier data including the location identity token and a device identifier from device data 464 from a display device system, and determines in step 686 whether the time stamp is still valid.

If the time stamp does not satisfy a time period criteria, then the display device system 8 is no longer within a transmission range of the transceiver's position in the location. The transceiver's position may be associated with a position of a real object, the appearance of which is changed in image data by a virtual object of the skin, e.g. a virtual overlay, or a space as identified by a space identifier 609 for the skin. The expired timestamp indicates the display device system 8 of the user has exited the location associated with the transceiver. As mentioned above, a location may be a physical space within another location, so a display device system may have more than one location associated with it. Responsive to an invalid time stamp, the server skin application 456 notifies a device application 456₁ executing on the display device system 8 that the transceiver identifier and location is no longer valid and does not send any more skin display data for the location associated with the transceiver identifier. In many examples, the skin application 456 may be sending a skin by streaming skin display data to a particular display device system 8. In step 690, based on the location identifier data received, the server skin application 456 associates a location with the device identifier and transmits the location in step 691 to the client skin application 456₁.

In other implementation examples, timestamps may not be used. For example, tracking a user using GPS or based on image data from the user's outward or physical environment facing cameras 113 or cameras, e.g. 20A and 20B, capturing image data of a location may be used as a basis for detecting the user's presence in a location. The example in FIG. 10 may be used as a backup for detecting presence via GPS and image data processing, for better privacy in using peer-to-peer transmission of a skin, or in locations where GPS signals or network access point signals are interrupted or have other transmission problems. For example, the implementation method of FIG. 10 may be used for detecting presence is a very small perimeter, e.g. detecting presence within less than a meter of a skin providing see-through, mixed reality display device system 8 or within a few feet of an object, e.g. a skeleton in the basement of a haunted house party is skinned with an image of a virtual vampire if a user is within 4 feet of it.

Figure 11:
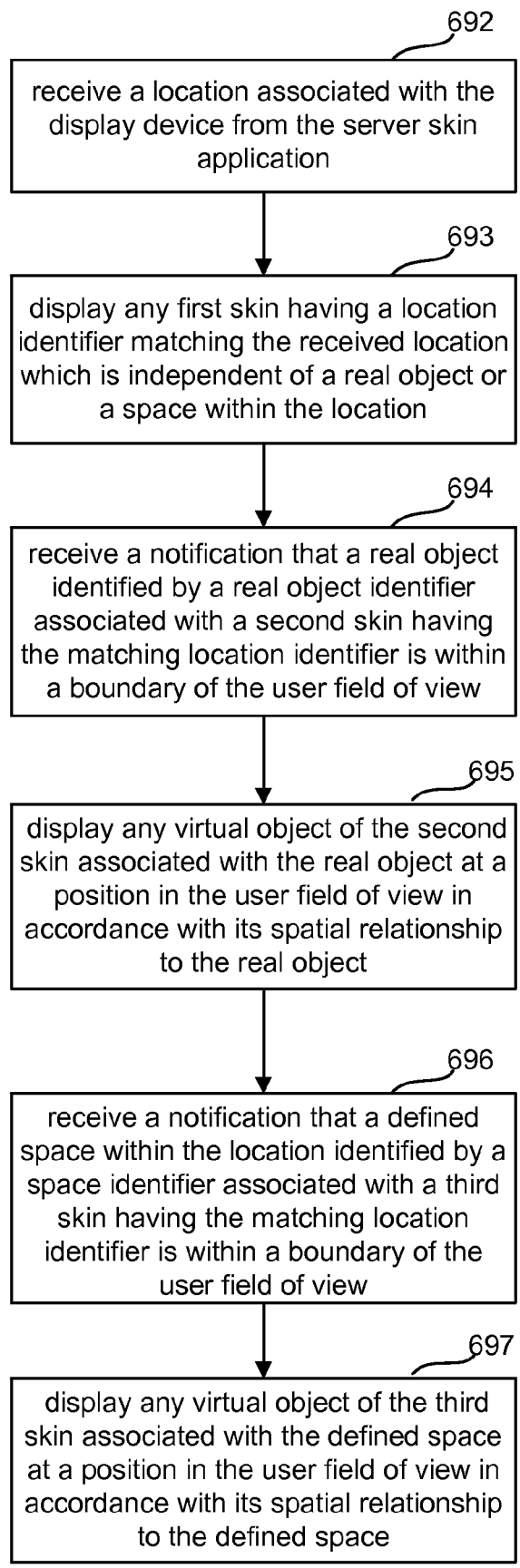
FIG. 11 is a flowchart of an implementation method example for displaying a skin in accordance with display parameters.

FIG. 11 is a flowchart of an implementation method example for displaying a skin in accordance with display parameters. In step 692, the client or device skin application 456₁ receives a location associated with the display device from the server skin application 456 and in step 693 displays any first skin having a location identifier matching the received location which is independent of a real object or a space within the location. For example, an ambient effect skin associated with a building or a room may be displayed first as this skin is not tied to a particular real object or a space within the location. A skin with a real object identifier, a space identifier or both is dependent of the user field of view for its display.

In step 694, the client skin application 456₁ receives a notification that a real object identified by a real object identifier associated with a second skin having the matching location identifier is within a boundary of the user field of view. Depending on implementation design, a boundary of the user field of view may be the boundaries of the user field of view as determined by the camera resolution or a predetermined distance outside the field of view when a 3D model of the location is available. For example, when a trajectory of a real object to have its appearance changed by a skin is being tracked, and the real object is within several feet of the user's display device, the notification provides extra time to predict where the real object will come into the user field of view and formulate opacity filter instructions and begin processing instructions for the image. Otherwise, the appearance of the real object may change in the user field of view which can be a desirable effect as well.

In step 695, the client skin application $456_1$ displays any virtual object of the second skin associated with the real object at a position in the user field of view in accordance with its spatial relationship to the real object. For example, if the virtual object is a mask, the virtual object tracks an identified facial portion of the real object. If the virtual object appears near the user's head, the virtual object tracks the user's head.

Additionally, in step 696, the client skin application $456_1$ receives a notification that a defined space within the location identified by a space identifier associated with a third skin having the matching location identifier is within a boundary of the user field of view, and in step 697, displays any virtual object of the third skin associated with the defined space at a position in the user field of view in accordance with its spatial relationship to the defined space. For example, three dimensional image data of animated characters for a skin may appear and move with a defined space in a large room.

Figure 12:
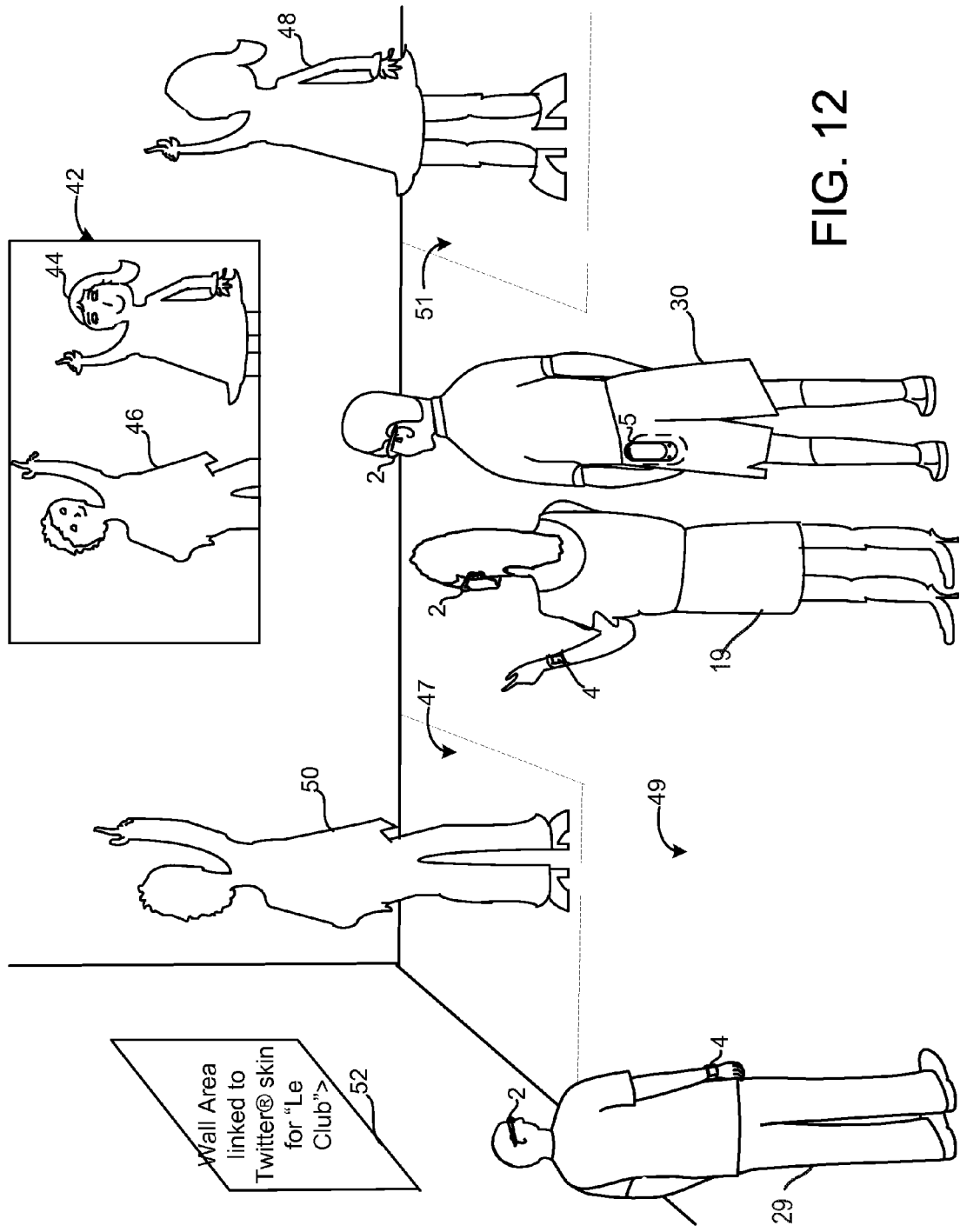
FIG. 12 illustrates examples of location based skins viewable through a see-through, mixed reality display device system.

FIG. 12 illustrates examples of location based skins viewable through a see-through, mixed reality display device system. One of the advantages of providing location based skins to users of see-through, mixed reality display device systems is that a motif in a physical location can be changed very easily. In the example of FIG. 12, a nightclub, "Le Club" is hosting a 1970's night in one of its rooms. Three users, Jim 29, Betty 19 and Alex 30 are wearing their see-through, display device systems 8. Jim 29 and Betty 19 wear a display device 2 and use a wrist based processing unit 4 in wireless communication with the device 2. Alex's display device system 8 includes the processing unit 4 embodied as a mobile device 5 in wireless communication with his display device 2. As part of 1970's night, a real object of a display 42 or a wall has a skin of video data playing scenes of famous 1970s movies, in this instance disco dancers from a 1970's disco dance movie. In this example, as seen through the display devices 2, the scene shows two dancers, a male dancer 46 and a female dancer 44 in 1970s attire and dance moves.

Furthermore, there is a first skin of a virtual object of a male dancer silhouette 50. The metadata for this skin includes a location identifier for the room and another for the building if under control of Le Club, a real object identifier for the floor 49 and a space identifier for a predefined space 47 in the room location. In this example, any user in the room wearing his see-through, mixed reality display device system who looks into the predefined space 47 will see the male dancer silhouette dancing. Similarly, any user in the room wearing a display device system 8 who looks at predefined space 51 will see a second skin of a female dancer 48 virtual object who also has a real object identifier for the floor 49 and a space identifier for the predefined space 51. In some examples, a user may have to come within a certain distance of the predefined space in order to see the dancer silhouette, so the male dancer silhouette skin may have multiple location identifiers.

Additionally, each of the display device systems 8 display in relation to wall area 52 as identified by its real object identifier a Twitter® feed skin for Le Club. Some users may have user settings which allow user data in the twitter feed to appear from all users, and some may limit via user settings the Tweets® to a certain set of users.

Figure 13:
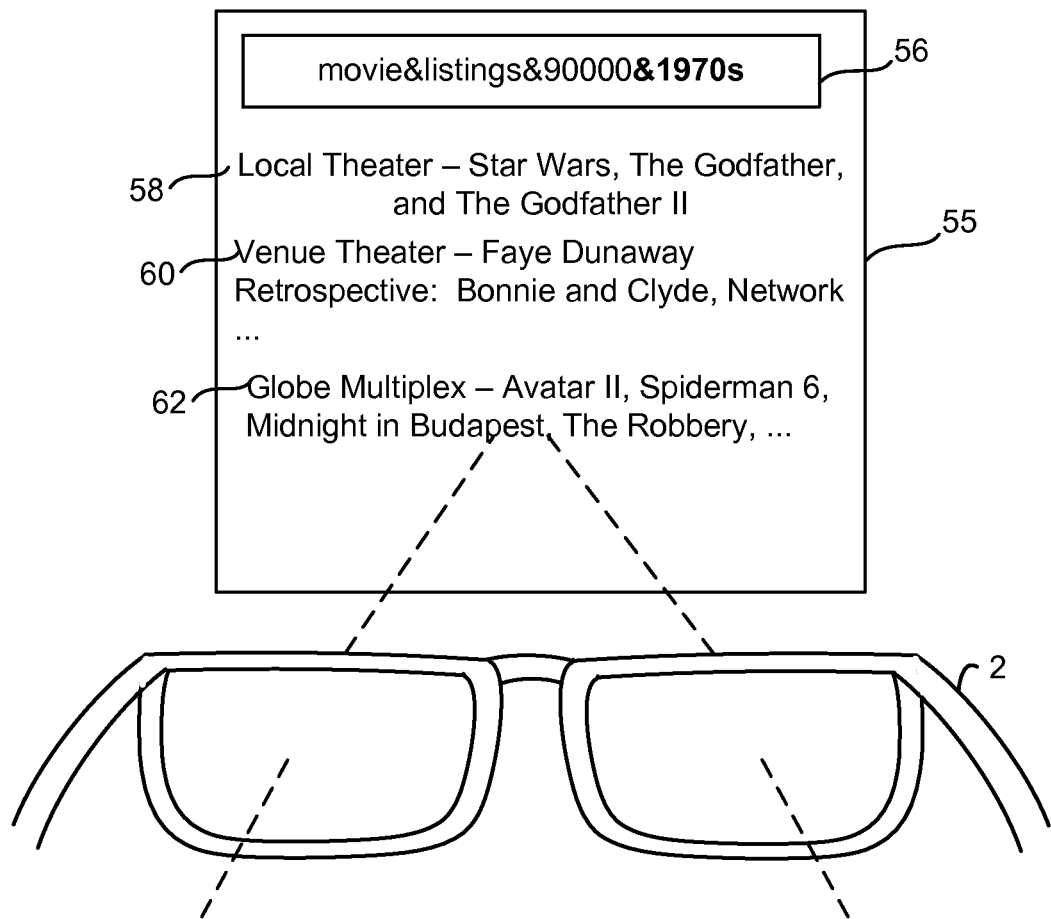
FIG. 13 illustrates an example of filtering content output of other applications displayed by a see-through, mixed reality display device system based on a theme of one or more skins associated with a location.

FIG. 13 illustrates an example of filtering content output of other applications displayed by a see-through, mixed reality display device system based on a theme of one or more skins associated with a location. In some embodiments, the client skin application $456_1$ works with the information push service application $459_1$ to filter content in accordance with the theme 613 of a skin when the user using the mixed reality display device system 8 is in the location. In this example, the information push service application $459_1$ via its monitoring of applications executing in the display device system 8 determines the user is using a search application with a search query 56 of "movie&listings&90000" indicating a search for movie listings in the 90000 zip code. Based on the theme 613 in the skin metadata, the push service application $459_1$ identifies the theme as the 1970s and adds "&1970s" to the search query as indicated by the bolded text to indicate highlighting. The push service application $459_1$ prioritizes results based on relevance to the theme for display by the image processing software 451. In this example, the search result 58 indicates the "Local Theater" is showing three 1970s classic films: Star Wars, The Godfather, and The Godfather II. A next search result 60 is for the "Venue Theater" which is having a Faye Dunaway Retrospective evening featuring two of her 1970s films "Bonnie and Clyde" and "Network." Next comes search result 62 indicating present day movies with no relation to the 1970s at the Globe Multiplex of "Avatar II", "Spiderman 6" "Midnight in Budapest" and "The Robbery" among others.

Figure 14A:
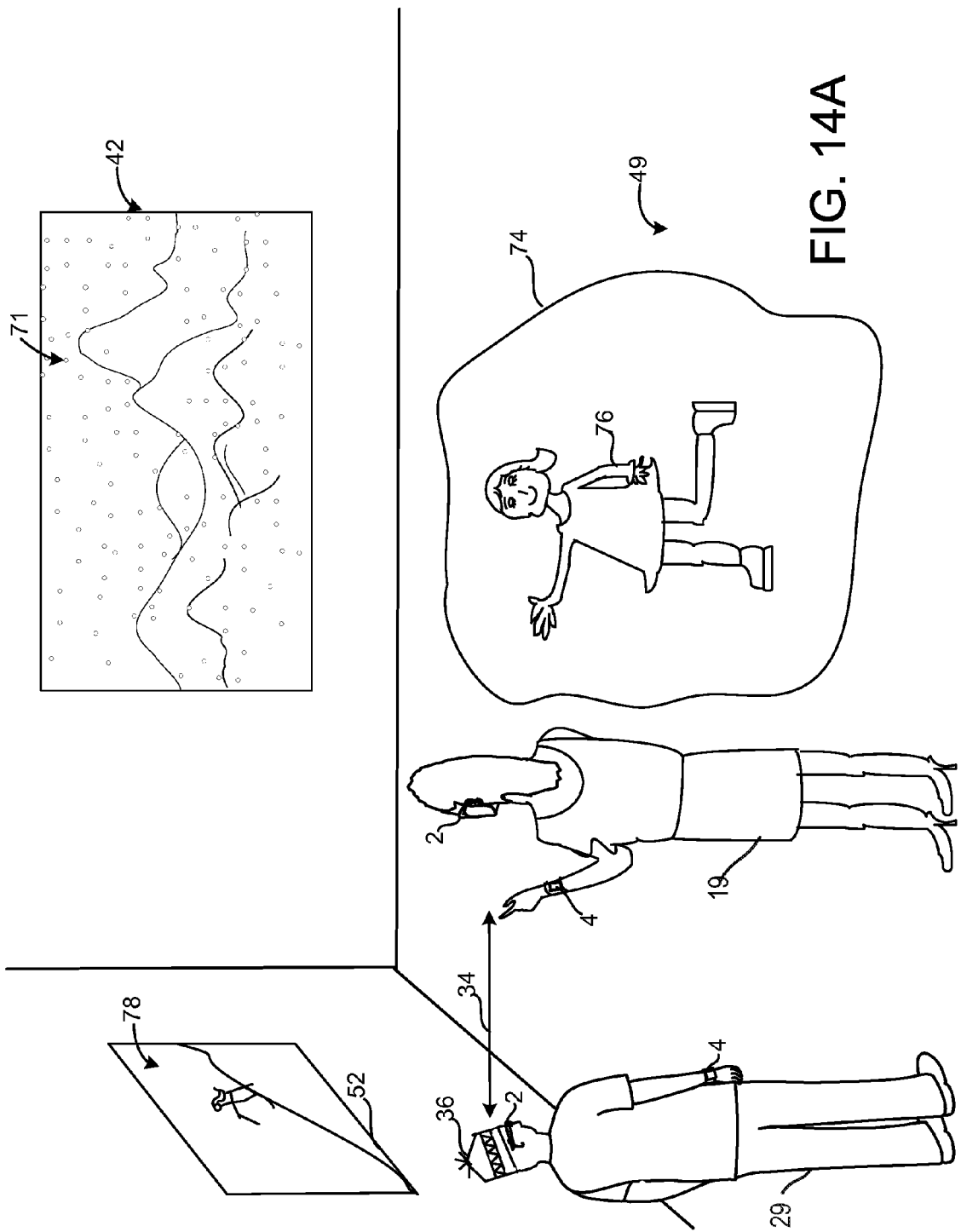
FIG. 14A illustrates other examples of location based skins viewable through a see-through, mixed reality display device system.

FIG. 14A illustrates other examples of location based skins viewable through a see-through, mixed reality display device system. FIG. 14A illustrates a winter themed evening at Le Club or a different room of Le Club hosting the winter themed evening. Users Jim 29 and Betty 19 using see-through, mixed reality display device systems 8 see a snowy mountain scene 71 on display area or wall area 42 and a virtual three-dimensional figure skater 76 which is linked by its meta data to a spatial relationship with the floor 49 (real object identifier) in a predefined space 74 as indicated by a space identifier.

Jim and Betty are friends and are both members of a local ski club. Both Betty 19 and Jim 29 have indicated via user input in their user settings members of the ski club as authorized recipients and senders of user data for this location on winter themed evenings. Their membership in the club may have been stored as part of their user profile data 460. Additionally, each of the display device systems 8 display in relation to wall area 52 as identified by its real object identifier see images, video and still, of winter sports scenes. Betty 19 has uploaded to the server skin application 456 user data of a video 78 of her skiing for which Jim 29 as a member of the ski club is an authorized recipient. He and Betty discuss her form in the video of her downhill run. Jim 29 also has permitted user data of a virtual ski hat 36 to be seen by see-through display device systems 8 of other ski club members in Le Club that evening. This enables Betty to give Jim her opinion of the hat before purchasing it.

As previously mentioned, a location may be defined as a distance or space surrounding an object. An example of such an object is a user wearing a see-through, mixed reality display device system 8. The object need not be stationary, so the location may move with the object. A user may have a skin he wishes to share with others within a distance or location perimeter. A device or client skin application $456_1$ can include instructions as well for the logic performed by a server skin application 456, and can therefore interact as a server skin application 456 to another client skin application $456_N$ on another device.

In an illustrative example, Jim has a skin of an ambient effect of snow falling which he likes to share with ski club members within a perimeter distance 34 of him when he is wearing his display device 2. In FIG. 14A, Betty is not detected within the perimeter 34. For example, none of Betty's infrared or Bluetooth (or WUSB or RFID) transceivers on either Betty's display device 2 or her processing unit 4 is within the perimeter 34 to receive a wireless signal from a transceiver of Jim's display device system 8. In another example, based on image data of Betty as viewed by Jim and uploaded to a remote depth image processing and skeletal tracking application 450, the image processing software 451 notifies the skin application $456_1$ operating in Jim's display distance that Betty is using a display device system 8 but is outside the perimeter 34.

FIG. 14B illustrates another example of a location based skin viewable through a see-through, mixed reality display device system wherein the location is a distance from another mixed reality display device system. In this example, Betty's display device system is detected within the perimeter 34. For example, a wireless transceiver on Betty's display device 2 or her processing unit 4 receives a wireless signal from Jim's display system 8 with a transceiver identifier and a time stamp which Betty's system 8 sends back in location identifier data. Betty's client skin application $456_N$ receives metadata and display data for the snow falling skin from Jim's device skin application $456_1$ and processes the skin with respect to user settings and metadata like any skin received from another computer system providing location based skins. Betty sees the falling snowflakes 72 too as she is a member of the ski club and her user settings allow skins from ski club members. Just one snowflake is labeled to avoid clutter in the drawing.

Figure 15:
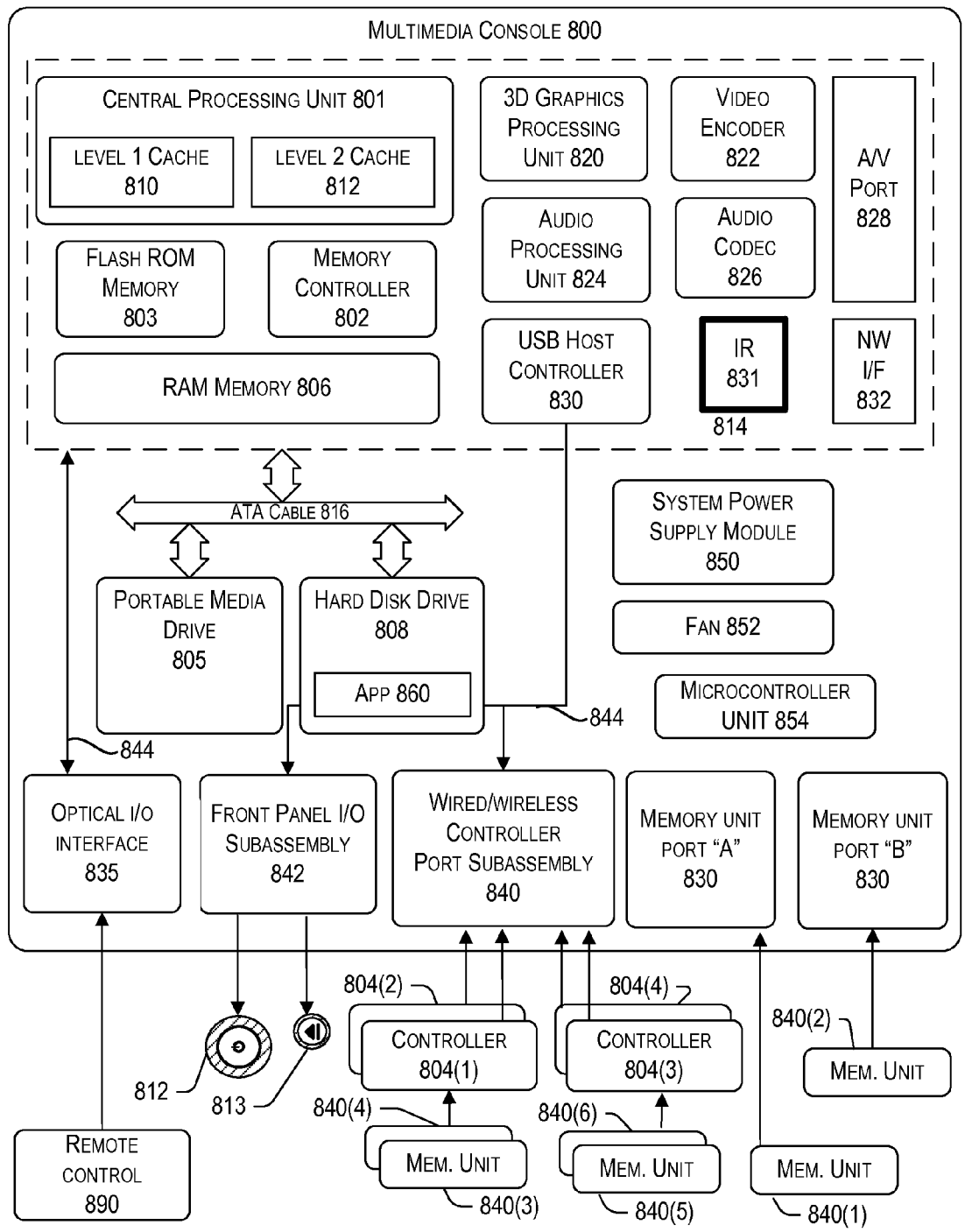
FIG. 15 is a block diagram of one embodiment of a computing system that can be used to implement a network accessible computing system hosting a skin application.

FIG. 15 is a block diagram of one embodiment of a computing system that can be used to implement a network accessible computing system hosting a skin application. For example, the embodiment of the computing system in FIG. 15 can be used to implement the hub computing system of FIGS. 1A and 1B. In this embodiment, the computing system is a multimedia console 800, such as a gaming console. As shown in FIG. 15, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 15 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, an RFID module, an infrared module, a WUSB module, a cable modem, and the like.

In the implementation depicted in FIG. 15 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1A), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

Figure 16:
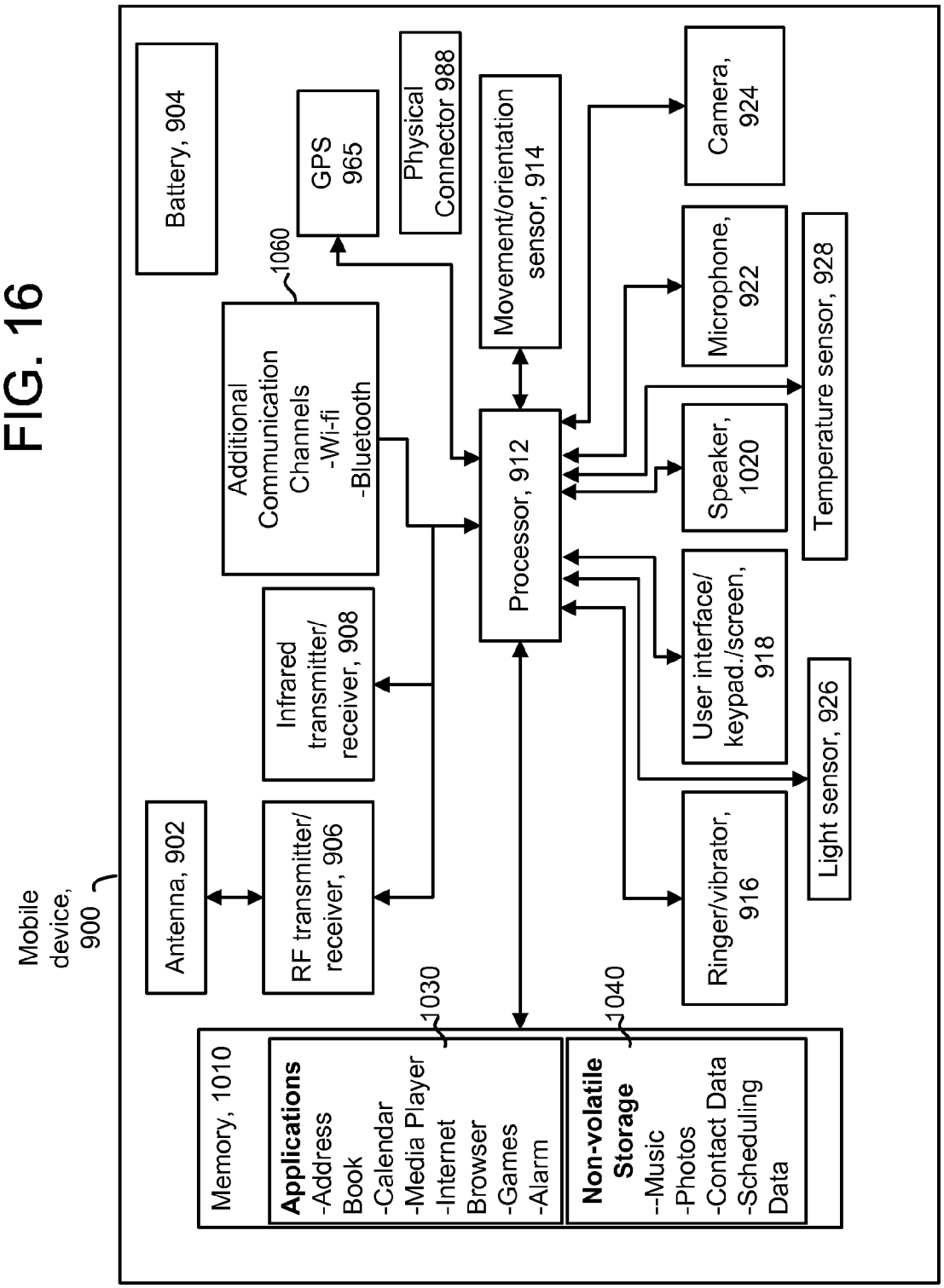
FIG. 16 is a block diagram of an exemplary mobile device which may operate in embodiments of the technology.

As discussed above, the processing unit 4 may be embodied in a mobile device 5. FIG. 16 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a skin application and image processing software for processing image data to and from the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more processor-readable non-volatile storage media having instructions encoded thereon for causing one or more processors to execute a method for displaying a location-based skin by a head mounted, mixed reality display device system, the method comprising:
   transmitting location identifier data indicating presence in a location to a skin providing computer system;
   receiving by the head mounted mixed reality display device system a skin associated with the location from the skin providing computer system, the skin including display data for a virtual object in the location; and responsive to the skin being authenticated, displaying the skin by the head mounted mixed reality display device system in accordance with skin display parameters and user settings while the head mounted mixed reality display device system is present in the location which further comprises receiving a location associated with the head mounted, mixed reality display device system;

displaying any first skin having a location identifier matching the received location which is independent of a real object or a space within the location;

responsive to receiving a notification that a real object identified by a real object identifier associated with a second skin having the matching location identifier is within a boundary of the user field of view, displaying any virtual object of the second skin associated with the real object at a position in the user field of view in accordance with its defined spatial relationship to the real object; and responsive to receiving a notification that a defined space within the location identified by a space identifier associated with a third skin having the matching location identifier is within a boundary of the user field of view, displaying any virtual object of the third skin associated with the defined space at a position in the user field of view in accordance with its defined spatial relationship to the defined space.

2. The one or more processor-readable non-volatile storage media of claim 1 wherein the location is a distance within another head mounted, mixed reality display device system.

3. The one or more processor-readable non-volatile storage media of claim 1 wherein the method further comprises:

receiving metadata of the skin associated with the location;

determining whether user settings authorize the skin to be displayed based on a source identifier in the metadata; and responsive to the user settings authorizing the skin to be displayed, requesting the skin associated with the location.

4. The one or more processor-readable non-volatile storage media of claim 1 wherein the method further comprises:

determining whether user settings authorize displaying user data from another user in the skin;

responsive to user settings not authorizing display of the user data, displaying the skin without the user data from the other user;

responsive to user settings authorizing display of the user data, incorporating the user data of the user authorized by the user settings into the display data of the skin while the head mounted, mixed reality display device system is present in the location, and displaying the skin with the incorporated user data while the head mounted, mixed reality display device system is present in the location.

5. The one or more processor-readable non-volatile storage media of claim 1 wherein the method further comprises:

sending user data for incorporation into a skin distributed to other users with user recipient settings identifying one or more users authorized to receive the user data for incorporation into the skin.

6. The one or more processor-readable non-volatile storage media of claim 5 wherein the method further comprises:

sending an expiration time for the user data for incorporation into the skin after which the user data is no longer displayed as part of the skin.

7. The one or more processor-readable non-volatile storage media of claim 5 wherein the method further comprises:

displaying user data including image data captured of the user at the location for selection by the user for uploading for incorporation into a skin.

8. The one or more processor-readable non-volatile storage media of claim 1 wherein the method further comprises:

receiving a theme associated with one or more skins in the location; and filtering content output by other applications executing in the head mounted, mixed reality display device system based on the theme.

9. A method for providing a location-based skin to a head mounted, mixed reality display device system comprising:

detecting a presence of the head mounted mixed reality display device system in a location further comprising broadcasting a location identity token including a time stamp and transceiver identifier from a transceiver at a predetermined position in the location, receiving location identifier data including the location identity token and a device identifier from the head mounted, mixed reality display device system, and determining whether the time stamp is still valid; and responsive to the time stamp still being valid, associating a location with the device identifier based on the location identifier data, transmitting the location associated with the device identifier to the head mounted, mixed reality display device system, authenticating a skin associated with the location based on security credentials, and sending the skin to the head mounted mixed reality display device system.

10. The method of claim 9 further comprising:

incorporating user data into a skin in accordance with user recipient settings.

11. The method of claim 10 wherein incorporating user data into a skin in accordance with user recipient settings further comprises:

receiving user data for incorporation into a skin from the head mounted, mixed reality display device system;

authenticating the user data based on security credentials;

determining whether there are any head mounted, mixed reality display device systems present in the location that are being used by users authorized by the user recipient settings to receive the user data; and responsive to there being users authorized by the user recipient settings to receive the user data, sending the user data with the skin identifier for the skin to the head mounted display device systems associated with the authorized users.

12. The method of claim 9 further comprising:

responsive to the time stamp not still being valid, notifying the head mounted display device system that the transceiver identifier and location are no longer valid, and stopping of sending skin display data for the location associated with the transceiver identifier.

13. The method of claim 9 further comprising sending one or more skins available for application to an appearance of a user in the head mounted mixed reality display device systems of other users.

14. A system for providing a location-based skin to a head mounted, mixed reality display device system comprising:

a computer system comprising one or more processors and a memory accessible by the one or more processors, the computer system being communicatively coupled via a network to the head mounted mixed reality display device system;

the memory storing display data of one or more skins in a format which the head mounted, mixed reality display device system can process for outputting the skin, the one or more skins including at least one skin for generating image data of a virtual object at a position in a location when the position is in a user field of view of the head mounted, mixed reality display device system;

the computer system comprising one or more sensors for detecting a presence of the head mounted, mixed reality display device system in the location;

the one or more processors for sending the one or more skins to the head mounted, mixed reality display device system responsive to detecting the presence of the display device system in the location;

the one or more processors also being for incorporating user data into the one or more skins in accordance with user recipient settings further comprising the one or more processors being for receiving user data for incorporation into the one or more skins from the head mounted, mixed reality display device system, authenticating the user data based on security credentials, determining whether there are one or more head mounted, mixed reality display device systems present in the location that are being used by one or more users authorized by the user recipient settings to receive the user data, and responsive to there being one or more users authorized by the user recipient settings to receive the user data, sending the user data with the one or more skin identifiers for the one or more skins to the one or more head mounted display device systems associated with the one or more authorized users.

15. The system of claim 14 wherein the one or more processors for sending the one or more skins to the head mounted, mixed reality display device system responsive to detecting the presence of the display device system in the location further comprises:

the one or more processors for streaming the one or more skins to the head mounted, mixed reality display device system responsive to detecting the presence of the display device system in the location.

16. The system of claim 14 wherein the one or more sensors for detecting a presence of the head mounted, mixed reality display device system into the location comprise at least one of the following:

a WiFi device;
an infrared device;
an image capture device;
a Global Positioning System (GPS) device;
a cellular telecommunication based device; and
a RFID device.

17. The system of claim 14 further comprising:

the computer system being communicatively coupled to one or more cameras for receiving image data of a location and creating a three-dimensional model of one or more objects in the location; and at least one of the one or more skins including a virtual object which changes the appearance of a real object in the location.

18. The system of claim 17 further comprising:

the one or more skins including at least one skin for generating image data of an ambient effect for a user field of view of the head mounted, mixed reality display device system in the location.

* * * * *